United States Patent
Watanabe et al.

(10) Patent No.: US 8,330,895 B2
(45) Date of Patent: Dec. 11, 2012

(54) METHOD OF MAKING ANTIGLARE FILM, ANTIGLARE FILM, POLARIZING PLATE, IMAGE DISPLAY DEVICE, AND TRANSMISSIVE/SEMI-TRANSMISSIVE LIQUID CRYSTAL DISPLAY

(75) Inventors: Jun Watanabe, Minami-Ashigara (JP); Hiroyuki Yoneyama, Minami-Ashigara (JP); Takato Suzuki, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 437 days.

(21) Appl. No.: 12/749,916

(22) Filed: Mar. 30, 2010

(65) Prior Publication Data
US 2010/0245715 A1 Sep. 30, 2010

(30) Foreign Application Priority Data
Mar. 30, 2009 (JP) ................. 2009-083794

(51) Int. Cl.
G02F 1/1335 (2006.01)
G02B 5/02 (2006.01)
G02B 1/08 (2006.01)
G02B 27/00 (2006.01)
B05D 5/06 (2006.01)
B05D 3/02 (2006.01)

(52) U.S. Cl. ............ 349/64; 349/187; 349/166; 349/96; 359/599; 359/601; 359/602; 359/603; 427/164; 427/162; 362/97.1

(58) Field of Classification Search .................. 349/187, 349/56, 62, 64, 96, 61, 166, 201, 195, 137; 359/599, 485, 485.1, 601, 602, 603; 362/97.1, 362/97.2, 97.3, 97.4; 427/163.1, 162, 163, 427/163.4, 164; 438/30
See application file for complete search history.

(56) References Cited

U.S. PATENT DOCUMENTS

| | | | | |
|---|---|---|---|---|
| 7,374,328 B2 * | 5/2008 | Kuroda et al. | ................ | 362/620 |
| 7,553,059 B2 * | 6/2009 | Kuroda et al. | ................ | 362/607 |
| 7,939,160 B2 * | 5/2011 | Furuya et al. | ................ | 428/141 |
| 2007/0217015 A1* | 9/2007 | Furuya et al. | ................ | 359/602 |
| 2009/0087617 A1 | 4/2009 | Suzuki et al. | | |
| 2010/0245714 A1* | 9/2010 | Watanabe et al. | ................ | 349/64 |
| 2010/0245715 A1* | 9/2010 | Watanabe et al. | ................ | 349/64 |
| 2010/0277674 A1* | 11/2010 | Watanabe et al. | ................ | 349/96 |
| 2012/0081653 A1* | 4/2012 | Oki | ................ | 349/195 |

FOREIGN PATENT DOCUMENTS

| | | |
|---|---|---|
| JP | 2001-172403 A | 6/2001 |
| JP | 2003-25504 A | 1/2003 |
| JP | 2009-98666 A | 5/2009 |
| WO | WO 2006/088202 A1 | 8/2006 |

\* cited by examiner

*Primary Examiner* — Brian Healy
(74) *Attorney, Agent, or Firm* — Buchanan Ingersoll & Rooney PC

(57) ABSTRACT

In a method for making an antiglare film including the casting, the releasing, the drying, the applying and the curing as defined herein, the transparent particles have an average primary particle size of greater than 2.5 μm and not greater than 12 μm, the transparent base has on at least one side thereof flat portions substantially parallel to a film-forming plane and rounded protrusions arising from the transparent particles, the protrusions having a maximum height Rt from the flat portions of from 1 to 15 μm, and the cured layer has an average thickness of from 1 to 15.0 μm and a surface profile with an arithmetic average roughness Ra, a mean spacing between peaks Sm, and an average slope θa, all as measured in accordance with JIS B0601, satisfying the relationships (1) to (3) as defined herein.

16 Claims, 5 Drawing Sheets

METHOD OF MAKING ANTIGLARE FILM, ANTIGLARE FILM, POLARIZING PLATE, IMAGE DISPLAY DEVICE, AND TRANSMISSIVE/SEMI-TRANSMISSIVE LIQUID CRYSTAL DISPLAY

CROSS-REFERENCE TO RELATED APPLICATIONS

This application claims the benefit of Japanese Patent Application JP 2009-083794, filed Mar. 30, 2009, the entire content of which is hereby incorporated by reference, the same as if set forth at length.

FIELD OF THE INVENTION

This invention relates to a method of making an antiglare film, an antiglare film, a polarizing plate, an image display device, and a transmissive or semi-transmissive liquid crystal display device.

BACKGROUND OF THE INVENTION

Liquid crystal displays (LCDs) have recently enjoyed wide use because of small thickness, light weight, and low power consumption. An LCD includes a liquid crystal cell and a polarizing plate. A polarizing plate is usually composed of protective films and a polarizing film and obtained by stretching a polyvinyl alcohol film dyed with iodine to make a polarizing film and laminating a protective film to both sides of the polarizing film. A transmissive LCD has a polarizing plate on both sides of a liquid crystal cell and may further have one or more optical compensation films. A reflective LCD usually has, in this order, a reflector, a liquid crystal cell, at least one optical compensation film, and a polarizing plate.

An antiglare film having a transparent base film coated with an antiglare layer is widely employed as a surface film of current display devices. Such an antiglare film is generally produced by incorporating organic or inorganic fine particles into an antiglare layer to texture the surface of the antiglare layer. The problem with this type of surface film is that the image appears washed out in a black display state due to reflected light, which can ruin the display qualities in terms of black levels or depth of blacks.

In order to obtain a display with desired color depth of black, i.e., high black level performance even in bright lightening, it is desirable to make the texture of the antiglare film gentler and smoother. However, it has been difficult to control the surface profile of the antiglare film of the type discussed.

To obtain a smoother surface texture, it has been proposed to dispose a layer with surface roughness on a base film and an additional layer thereon to provide a controlled surface profile as disclosed in WO 2006/88202. JP 2003-25504A discloses an antireflective film having a base with surface roughness, an active ray-cured resin layer with a controlled arithmetic average surface roughness Ra, and an antireflective layer in that order. The film is described as providing good display visibility by the control of the Ra of the active ray-cured resin layer.

SUMMARY OF THE INVENTION

The technique of WO 2006/88202 requires at least two coating operations to obtain a desired surface profile, which is expected to involve additional cost of equipment and loss of yield. Although the technique of JP 2003-25504A allows for providing an antiglare function, the disclosure does not enter into elaboration of surface designing. That is, to control only the Ra of the active ray-cured resin layer invites reduction in contrast or causes scintillation or is incapable of achieving antiglare performance without inducing contrast reduction or scintillation.

An object of the invention is to provide an antiglare film and a polarizing plate that contribute to the improvement of display qualities and thickness reduction of image display devices, such as LCDs, and a method for making the antiglare film easily and at low cost.

Another object of the invention is to provide an image display device with high front white brightness, high contrast, low scintillation, and low interference, such as a Moire phenomenon.

The above objects are accomplished by the invention.

The invention provides in its first aspect a first method of making an antiglare film including the steps of (1) making a transparent base including the substeps of casting a dope containing at least a thermoplastic resin and transparent particles on a support, releasing the cast film from the support, and drying the cast film, (2) applying a coating solution containing at least a curing compound, a polymerization initiator, and a solvent on the transparent base and removing the solvent by drying, and (3) curing the curing compound to form a cured layer. The transparent particles have an average primary particle size of greater than 2.5 μm and not greater than 12 μm. The transparent base has on at least one side thereof flat portions substantially parallel to a film forming plane and rounded protrusions arising from the transparent particles. The maximum height Rt of the protrusions from the flat portions is in the range of from 1 to 15 μm. The cured layer has an average thickness of 1 to 15.0 μm. The cured layer has a surface profile with an arithmetic average roughness Ra, a mean spacing Sm (the mean distance between profile peaks at the mean line), and an average slope θa, all as measured in accordance with JIS B0601, satisfying relationships (1) to (3):

$$0.01\ \mu m \leq Ra \leq 0.2\ \mu m \tag{1}$$

$$10\ \mu m \leq Sm \leq 300\ \mu m \tag{2}$$

$$0.3° \leq \theta a \leq 1.5° \tag{3}$$

The invention provides a second method of making an antiglare film including the steps of (1) making a transparent base including the substeps of casting a dope containing at least a thermoplastic resin and transparent particles on a support, releasing the cast film from the support, and drying the cast film, (2) applying a coating solution containing at least a curing compound, a polymerization initiator, and a solvent on the transparent base and removing the solvent by drying, and (3) curing the curing compound to form a cured layer. The transparent particles have an average primary particle size of greater than 2.5 μm and not greater than 12 μm. The transparent base has on at least one side thereof flat portions substantially parallel to a film-forming plane and rounded protrusions arising from the transparent particles. The maximum height Rt of the protrusions from the flat portions is in the range of from 1 to 15 μm. The cured layer has an average thickness of 1 to 15.0 μm. The cured layer has a surface profile with a slope distribution satisfying conditions (a) to (c) below.
(a) The integral value of the frequency of slopes from 0° to less than 0.3° is 0% to 25%.
(b) The integral value of the frequency of slopes from 0.3° to less than 5.0° is 65% to less than 100%.
(c) The integral value of the frequency of slopes of 5.0° or more is 0% to 10%.

The invention provides a preferred embodiment of the first and second methods, in which the substep of casting a dope is a substep of casting at least two dopes simultaneously or successively, and the transparent particles are contained in the dope adapted to form a layer adjacent to the cured layer; or which does not include a step of winding after the substep of casting a dope or dopes until the production of the antiglare film.

The invention also provides in its third aspect an antiglare film including a transparent base containing a thermosetting resin as a main component and transparent particles with an average primary particle size of greater than 2.5 µm and not greater than 12 µm having provided thereon at least a cured layer with an average thickness of 1 to 15.0 µm. The transparent base has, on the surface of the side having the cured layer, flat portions substantially parallel to a film-forming plane and rounded protrusions arising from the transparent particles. The maximum height Rt of the protrusions from the flat portions is in the range of from 1 to 15 µm.

The invention provides a preferred embodiment of the antiglare film, in which the arithmetic average roughness difference ΔRa between the surface of the cured layer and the surface of the transparent base on its side having the cured layer is 0.1 to 1.0 µm, the arithmetic average roughness being determined in accordance with JIS B0601; in which the cured layer has a ratio of minimum thickness $t_{min}$ to maximum thickness $t_{max}$ ($t_{min}/t_{max}$) of 0.01 to less than 0.8; in which the transparent particles are nearly spherical resin particles; in which the transparent base and the transparent particles have an absolute difference in refractive index of less than 0.09; which has light scattering properties such that it provides an image clarity of 20% to 75% as measured using an image clarity meter at an optical comb width of 0.5 mm in accordance with JIS K7105; or which has an internal haze of 0.1% to 30% and a surface haze of 0.5% to 5.0%.

The invention also provides in its fourth aspect a polarizing plate including a polarizing film and a protective film on at least one side of the polarizing film, the protective film being the antiglare film of the invention.

The invention also provides in its fifth aspect an image display device having the antiglare film of the invention or the polarizing plate of the invention.

The invention also provides in its sixth aspect a transmissive or semi-transmissive LCD having the polarizing plate of the invention on the front side and/or on the backlight side of the liquid crystal cell.

In application to image display devices, the antiglare film of the invention provides high front white brightness, high contrast, low scintillation, and reduced interference patterns, such as Moire.

DESCRIPTION OF REFERENCE NUMERALS

Figure 1C:
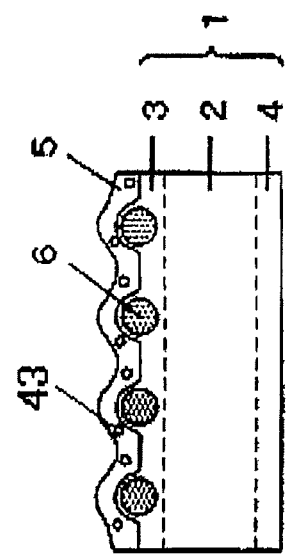
FIG. 1A, FIG. 1B, and FIG. 1C each illustrate a cross-section of an example of the antiglare film according to the invention.

1: Transparent base
2: Basal layer
3: Surface layer
4: Surface (or back) layer
5: Cured layer
6: Transparent particle
7: Second cured layer
11: Stirrer
12: Transfer pump
13: Filter
14: Stock tank
15a: Delivery pump for back layer
15b: Delivery pump for basal layer
15c: Delivery pump for surface layer
16a: Additive (e.g., solvent or matting agent) injection pump
16c: Additive (e.g., solvent or transparent particles) injection pump
17: Casting die
18: Casting belt
19: Vacuum chamber
20: Casting drum
30: Casting die
32: Manifold
33: Feed block
41: Flat portion
42: Protrusion
43: Particle

DETAILED DESCRIPTION OF THE INVENTION

The invention relates to an antiglare film with controlled light scattering properties obtained by forming a cured layer on a transparent base having a specific surface profile. The antiglare film of the invention provides an image display device with high front white brightness, high contrast, low scintillation, and reduced interference patterns, such as Moire, particularly when used as a protective film of a polarizing plate disposed on the backlight side of a liquid crystal cell of an LCD.

The first and second methods of making an antiglare film according to the invention both include the steps of (1) making a transparent base including the substeps of casting a dope containing at least a thermoplastic resin and transparent particles on a support, releasing the cast film from the support, and drying the cast film, (2) applying a coating solution containing at least a curing compound, a polymerization initiator, and a solvent on the transparent base and removing the solvent by drying, and (3) curing the curing compound to form a cured layer.

In the first method, the transparent particles have an average primary particle size of greater than 2.5 µm and not greater than 12 µm. The transparent base has on at least one side thereof flat portions substantially parallel to a film-forming plane and rounded protrusions arising from the transparent particles. The maximum height Rt of the protrusions from the flat portions is 1 to 15 µm. The cured layer has an average thickness of 1 to 15.0 µm. The cured layer has a surface profile with an arithmetic average roughness Ra, a mean spacing Sm, and an average slope θa, all as measured in accordance with JIS B0601, satisfying relationships (1) to (3):

$$0.01\ \mu m \leq Ra \leq 0.2\ \mu m \quad (1)$$

$$10\ \mu m \leq Sm \leq 300\ \mu m \quad (2)$$

$$0.3° \leq \theta a \leq 1.5° \quad (3)$$

In the second method, the transparent particles have an average primary particle size of greater than 2.5 μm and not greater than 12 μm. The transparent base has on at least one side thereof flat portions substantially parallel to a film-forming plane and rounded protrusions arising from the transparent particles. The maximum height Rt of the protrusions from the flat portions is 1 to 15 μm. The cured layer has an average thickness of 1 to 15.0 μm. The cured layer has a surface profile with a slope distribution satisfying conditions (a) to (c) below.
(a) The integral value of the frequency of slopes from 0° to less than 0.3° is 0% to 25%.
(b) The integral value of the frequency of slopes from 0.3° to less than 5.0° is 65% to less than 100%.
(c) The integral value of the frequency of slopes of 5.0° or more is 0% to 10%.

The antiglare film according to the invention includes a transparent base containing a thermosetting resin as a main component and transparent particles with an average primary particle size of greater than 2.5 μm and not greater than 12 μm and at least a cured layer with an average thickness of 1 to 15.0 μm provided on the transparent base. The transparent base has, on the surface of the side having the cured layer, flat portions substantially parallel to a film-forming plane and rounded protrusions arising from the transparent particles. The maximum height Rt of the protrusions from the flat portions is from 1 to 15 μm.

An LCD includes, for example, a light source, a light guide panel, a first diffuser sheet, a light collecting sheet (e.g., a prism sheet), a second diffuser sheet, a liquid crystal panel (an assembly of a first polarizing plate, a liquid crystal cell, and a second polarizing plate) in the order described. The polarizing plate is a three layer laminate composed of a polarizing film and a protective film on both sides of the polarizing film. The viewer's side protective film of the second polarizing plate usually has a hardcoat layer, an antistatic layer, antireflection layer, an antiglare layer, and so forth on its viewer's side surface. The antiglare layer and the antireflection layer are provided for the purpose of improving display visibility. If the antiglare layer is so poorly designed as to have protrusions with a steeply rising slope on its surface, what we call black washout occurs to deteriorate depth of blacks. The antiglare film of the invention succeeds in achieving both antiglare function (the properties of obscuring the source of reflected light) and depth of blacks because of its surface profile controlled within specific ranges of parameters.

The washout problem with conventional techniques arises because surface components having steep slopes reflect and scatter ambient light at unfavorably large angles in various directions. In contrast, the antiglare film of the invention, which has a transparent base with a specific surface profile and a cured layer with a proper thickness provided on the base, has a surface profile composed solely of components with gentle slopes. Accordingly, the antiglare film of the invention appropriately scatters the image of the source of directly reflected light (specularly reflected light) to perform antiglare function without causing the washout problem. As for transmission performance, since larger angle scattering than necessary does not occur, reductions in front brightness and front contrast are prevented, and scintillation and Moire caused by the interference with other periodic members are reduced.

[I] Surface Profile of Antiglare Film

The antiglare film of the invention includes a transparent base and a cured layer on the transparent base and exhibits light scattering performance. The transparent base has at least one surface thereof textured with slopes and contains transparent particles having an average primary particle size of greater than 2.5 μm and not greater than 12 μm. In what follows, the surface of the antiglare film on the cured layer side having a controlled surface profile to achieve controlled antiglare properties will be defined to be surface A, and the opposite surface will be defined to be surface B. The surface profile on surface A will be described first.

The antiglare film of the invention should have a controlled slope of surface profile so as to have forward scattering properties. For this purpose, it is necessary for the cured layer to have surface roughness parameters defined in JIS B0601 satisfying relationships (1) to (3):

$$0.01\ \mu m \leq Ra \leq 0.2\ \mu m \quad (1)$$

$$10\ \mu m \leq Sm \leq 300\ \mu m \quad (2)$$

$$0.3° \leq \theta a \leq 1.5° \quad (3)$$

Preferably, these roughness parameters satisfy relationships (1') to (3'):

$$0.02\ \mu m \leq Ra \leq 0.15\ \mu m \quad (1')$$

$$50\ \mu m \leq Sm \leq 200\ \mu m \quad (2')$$

$$0.4° \leq \theta a \leq 1.3° \quad (3')$$

More preferably, the roughness parameters satisfy relationships (1") to (3"):

$$0.03\ \mu m \leq Ra \leq 0.12\ \mu m \quad (1")$$

$$80\ \mu m \leq Sm \leq 150\ \mu m \quad (2")$$

$$0.5° \leq \theta a \leq 1.0° \quad (3")$$

The roughness parameters discussed above are measured using a roughness meter that is in accordance with JIS B0601 (2001), for example, Surfcorder SE-3500 from Kosaka Laboratory, Ltd. The slope θa is calculated from the arithmetic average slope Δa described in ASME B46.1-1995 as follows.

$$\theta a = \tan^{-1} \Delta a$$

If the cured layer has an Ra less than 0.01 μm, sufficient antiglare effects are not obtained. If the Ra exceeds 0.2 μm, ambient light is scattered at larger angles than necessary, resulting in, for example, washout of display image. If the Sm of the cured layer is more than 300 μm, the spacing between protrusions is too large to impart antiglare properties to the surface or to eliminate Moire. When transparent particles greater than 2.5 μm and not greater than 12 μm are used to make a transparent base with a textured surface, it is unlikely that the cured film formed thereon has an Sm less than 10 μm. If the Sm is less than 10 μm, it easily follows that the slope θa exceeds 1.5°, making it difficult to obtain a desired surface profile. An Sm less than 10 μm also makes it difficult to obtain a desired surface profile while controlling the θa so as not to exceed 1.5°. To eliminate Moire on an LCD panel, it is preferred that the Sm be equal to or less than the pitch of the backlight side prism sheet or equal to or less than twice the pixel pitch of the liquid crystal cell. If the θa is less than 0.3°, too much light components are specularly reflected or propagated straight to obtain antiglare and scattering effects. If the θa is more than 1.5°, the unnecessary light components scattered at large angles increase to cause color washout.

The surface profile of surface A of the antiglare film is also specified in terms of other parameters, slope and slope distribution, determined as follows.

Vertices of an imaginary triangle A with an area of 0.5 to 2 µm² are placed on a transparent support. A vertical line is drawn upward from each vertex. The three intersections of the vertical lines with the film surface (surface A) make a triangle B. The angle formed between the normal to the plane of the triangle B and the vertical to the support is taken as the slope.

An measurement area of at least 250,000 µm² (0.25 mm²) of the support is divided into the imaginary triangles A. The slope of the film surface is determined for each of the triangles A as described, and the ratio of the number of triangles B with a certain slope to the total number of triangles B (the frequency of occurrence of a certain slope) is calculated. This ratio is defined to be the frequency of a slope. In the invention, the integral values of the frequency of slopes from 0° to less than 0.3°, the frequency of slopes from 0.3° to less than 5.0°, and the frequency of slopes of 5.0° or more are obtained. For the details of the slope measurement, reference may be made to JP 2007-108724A.

In the measurement of slope frequencies, the assessment area on the support is preferably at least 250,000 µm² (0.25 mm²), more preferably 0.25 to 1.0 mm². The area of the triangle A (unit measurement area) of 0.5 to 2 µm² is preferred for ensuring measurement accuracy.

While several instruments are available for the slope measurement, SXM520-AS150 from Micromap Corp. (USA) is used in the invention, which includes a halogen lamp with an interference filter having a center wavelength of 560 nm as a light source and an objective lens having a magnification of 2.5 to 50 times. Data acquisition is performed using a ⅔" CCD having 640×480 pixels, standard equipment of the instrument. When the objective lens has a magnification of 10 times, the unit measurement area of slope measurement is 0.8 µm², and the total measurement area is 500,000 µm² (0.5 mm²) The unit area and the total measurement area decrease with an increase of the magnification times of the objective lens. The measured data are analyzed using software, such as MAT-LAB from Math Works, Inc. (USA), to calculate the slope distribution. The interval of slope measurement is set at about 0.01°.

It is necessary in the invention that the antiglare film have the following slope distribution on its surface A.
(a) The integral value of the frequency of slopes from 0° to less than 0.3° is 0% to 25%.
(b) The integral value of the frequency of slopes from 0.3° to less than 5.0° is 65% to less than 100%.
(c) The integral value of the frequency of slopes of 5.0° or more is 0% to 10%.

The slope distribution on surface A is preferably as follows.
(a') The integral value of the frequency of slopes from 0° to less than 0.3° is 0% to 22%.
(b') The integral value of the frequency of slopes from 0.3° to less than 5.0° is 70% to less than 100%.
(c') The integral value of the frequency of slopes of 5.0° or more is 0% to 8%.

The slope distribution on surface A is more preferably as follows.
(a") The integral value of the frequency of slopes from 0° to less than 0.3° is 0% to 20%.
(b") The integral value of the frequency of slopes from 0.3° to less than 5.0° is 75% to less than 100%.
(c") The integral value of the frequency of slopes of 5.0° or more is 0% to 5%.

With the integral value of the frequency of slopes from 0° to less than 0.3° exceeding 25%, the proportion of smooth portions is too high to obtain sufficient scattering properties. If the integral value of the frequency of slopes from 0.3° to less than 5.0° is less than 65%, surface components that scatter light at angles appropriate to antiglare function and less influential on front contrast decrease. If the integral value of the frequency of slopes of 5.0° or more exceeds 10%, surface components that scatter light at large angles increase, resulting in color washout or reduction in front contrast.

[II] Surface Profile of Transparent Base

The antiglare film of the invention has a surface profile optimized by providing a cured layer on a transparent base having a textured surface. Accordingly, the transparent base, too, should have a well controlled surface profile. Specifically, it is necessary that, as illustrated in FIG. 1A, a transparent base 1 contain transparent particles 6, have a cured layer 5 provided thereon, and have flat portions 41 substantially parallel to a film-forming plane and rounded protrusions 42 arising from the transparent particles 6 and that the maximum height Rt from the flat portions 41 to the protrusions 42 be in the range of from 1 to 15 µm. As used herein, the term "film-forming plane" refers to a plane including the film forming direction in the formation of the transparent base. When a film has a smooth surface, the film-forming plane is identical to the surface of the film. When a film has unevenness on at least one side thereof as with the transparent base used in the invention, the film forming plane thereof is defined to be the plane obtained by leveling off the surface unevenness in a 1 cm² area. The Rt of the transparent base is preferably 1.5 to 12 µm, more preferably 2 to 10 µm. With the Rt less than 1 µm, the surface profile control by the provision of a cured layer is unsuccessful. If the Rt is more than 15 µm, a desired surface profile as an antiglare film is not obtained. The Rt is measured in accordance with JIS B0601.

It is preferred for the antiglare film of the invention to have a peak-to-valley height (height difference between flat portions and protrusions) of 0.5 to 8 µm, more preferably 1 to 6 µm. The peak-to-valley height is measured by, for example, observing a section of the antiglare film along a line passing the top of a protrusion of the transparent base under a scanning electron microscope (SEM).

It is desirable that the applied dope containing the transparent particles dry before it levels out so that the above discussed surface profile of the base may be the reflection of the shape of the particles. That is, the dope preferably has as high a viscosity as possible, specifically a viscosity of at least 1000 cP, more preferably 5000 cP or higher. It is difficult, nevertheless, to apply such a high viscosity dope by conventional coating techniques. The present inventors have succeeded in applying a high viscosity (e.g., 10,000 cP) thermoplastic resin solution (dope) by casting.

[III] Formation of Cured Layer to Provide Gently Sloped Texture

To obtain the antiglare film of the invention with a controlled surface slope distribution, it is important to once form a base with the above specified surface roughness and then to make the slope of the surface roughness gentler by the formation of a cured layer. For this, the following control is required.

The cured layer has an average thickness of 1 to 15.0 µm, in connection with the above specified Rt, to secure a desired surface profile. The average thickness is preferably 2 to 13 µm, more preferably 3 to less than 11 µm. With a thickness smaller than 1 µm, the cured layer fails to achieve appropriate control on the surface profile. The average thickness of a cured layer as referred to herein is an average of thicknesses of the cured layer as measured over a length of 0.5 mm on a cross-section of an antiglare film containing the cured layer taken along any plane perpendicular to the film plane under observation using, e.g., SEM. In the case where the interface between the cured layer and the base is obscure, the film may be stained with, e.g., osmic acid.

It is preferred that the arithmetic average roughness of the transparent base (Ra, b) and that of the cured layer (Ra, c), both determined in accordance with JIS B0601, have a difference $\Delta Ra$ (=Ra, b−Ra, c) of 0.1 to 1.0 µm, more preferably 0.2 to 0.8 µm. A difference $\Delta Ra$ of 0.1 µm or more indicates sufficient surface profile control that secures sufficient antiglare performance. With the difference $\Delta Ra$ of 1.0 µm or less, a desired surface profile is obtained.

For better surface profile control, the cured layer preferably has a ratio of minimum thickness $t_{min}$ to maximum thickness $t_{max}$ ($t_{min}/t_{max}$) of 0.01 to less than 0.8, more preferably 0.02 to less than 0.75. With this ratio being 0.01 or higher, the cured layer has necessary hardness and good resistance to scratches even in its thinnest part. The ratio of less than 0.8 indicates effective leveling for a desired surface profile.

It is preferred that the coating solution for forming the cured layer level out moderately during application and drying. Specifically, the coating solution preferably has a viscosity of about 1 to 100 cP, and the solid matter of the coating solution preferably has a viscosity of 10 cP or higher. The concentration of the solution preferably ranges from 0.5% to a few tens of percent by mass, while depending on the solvent. When the viscosity of the coating solution is 1 cP or higher, or that of the solid matter is 10 cP or higher, the coating solution moderately levels out to provide a desired surface profile that will eliminate Moire. The coating solution which has a viscosity of 100 cP or lower levels out efficiently to provide a desired surface profile.

The coating solution for forming the cured layer may contain particles for surface profile control, electrically conductive (hereinafter, simply "conductive") inorganic particles, a conductive polymer, a stain resistant fluorine or silicone material, and so on as long as the desired surface profile is maintained.

If necessary, an additional layer, such as an inorganic conductive particle-containing layer, a conductive polymer layer, a stain resistant fluorine or silicone layer, a low refractive index layer, or an antireflection layer, may be provided on the cured layer either simultaneously with or successively after the formation of the cured layer.

The antiglare film may be produced by a continuous in-line method that includes the step of making the transparent base and the step of forming the cured layer and does not include a step of winding after the casting until the production of the antiglare film. In this case, the applied dope for the transparent base preferably has a residual solvent content of 2% to 50% by mass at the time when the coating solution for forming the cured layer is applied thereon. A residual solvent content of 2 mass % or more provides good adhesion irrespective of the solvent used in the coating solution. With a residual solvent content of not more than 50 mass %, excessive penetration of the solvent of the coating solution into the dope for the base is prevented, the coated web is easy to handle on rollers, and it is easy to control the surface profile as desired.

It is preferred for the improvement of production efficiency and from the viewpoint of cost that the method does not include a winding step after the preparation of the transparent base until the production of the antiglare film.

The form or surface profile of surface B of the antiglare film is not particularly limited. However, it is preferred for surface B to be smooth so as to provide intimate adhesion to a polarizing film in the production of a polarizing plate and to minimize the adverse influences on the above described light scattering characteristics of surface A. Surface B preferably has an arithmetic average surface roughness Ra of 0.001 to 0.10 µm, more preferably 0.001 to 0.05 µm, even more preferably 0.001 to 0.03 µm.

[IV] Optical Characteristics of Antiglare Film

The antiglare film preferably has an internal haze due to internal light scattering (i.e., total haze minus surface haze) of 0.1% to 30%, more preferably 0.5% to 25%, even more preferably 1% to 20%. The internal haze within that range provides moderate internal scattering which, as well as the surface scattering due to the surface unevenness, is effective in diminishing the appearance of patterns, color nonuniformity, brightness nonuniformity, and the like of a liquid crystal panel.

The antiglare film preferably has a surface haze due to surface unevenness of 0.5% to 5.0%, more preferably 0.8% to 4.5%, even more preferably 1.0% to 4.0%.

The surface of the transparent base on which the cured layer is to be formed preferably has roughness to some extent to give a total haze of 10% or more, more preferably 15% or more, even more preferably 30% or more.

The light scattering properties of the antiglare film is preferably such as to provide an image clarity of 20% to 75%, more preferably 30% to 70%, even more preferably 40% to 65%, as measured using an image clarity meter at an optical comb width of 0.5 mm in accordance with JIS K7105. With such light scattering properties, the antiglare film prevents occurrence of scintillation and reduction of front contrast and diminishes the appearance of patterns, color nonuniformity, brightness nonuniformity, Moire, and the like of a liquid crystal panel.

[V] Transparent Particles

Forming a cured layer on the transparent base the surface profile of which has the above discussed characteristics results in the provision of a surface with particularly preferred profile. Therefore, the transparent particles used in the invention are preferably nearly spherical and may be distributed over the whole thickness of the transparent base but are preferably localized near the surface of the base. The particles should have an average primary particle size more than 2.5 µm and not more than 12 µm so as not only to make the above-specified protrusions but, in the case of producing internal scattering, to promote forward scattering while suppressing large angle scattering. The average primary particle size is preferably more than 3.5 µm and not more than 11 µm, more preferably more than 5 µm and not more than 10 µm. If the average primary particle size is 2.5 µm or smaller, protrusions are hardly formed, and light would scatter at unnecessary large angles. If the average primary particle size exceeds 12 µm, it is difficult to effect surface profile control with a cured layer. The particles preferably have a refractive index of 1.40 to 1.65, more preferably 1.45 to 1.60, even more preferably 1.45 to 1.55. Methods of primary particle size measurement include a laser scattering method, a diffraction method, an electrical resistance method (Coulter method), and a flow particle image analysis. In the invention, the primary particle size is defined to be an average sphere equivalent particle size measured with a Coulter Multisizer by the electrical resistance method. Whether the average primary particle size of the particles in the antiglare film is in the range recited is confirmed by observing a sample film between a glass slide and a cover glass with an index matching oil (Immersion Oil A from Nikon Corp.) therebetween under an optical microscope and measuring the sphere equivalent particle size of 500 particles to obtain the average.

The absolute difference between the refractive index of the transparent particles and that of the transparent base is preferably less than 0.09, more preferably 0.07 or less, even more preferably 0.05 or less. When the refractive index difference is 0.09 or greater, incident light is scattered at the surface of the particles at too large angles, resulting in an increase of large angle scattered components. When the refractive index difference is within the range recited, a combination of the internal scattering and the surface scattering will provide moderate forward scattering properties. It makes no difference which of the transparent particles and the transparent base has a larger refractive index. That is, the refractive index of the transparent particles may be either larger or smaller than that of the transparent base. Transparent particles having a larger refractive index than the transparent base and transparent particles having a smaller refractive index than the transparent base may be used in combination.

The refractive index of the transparent base is the refractive index of the transparent base containing no transparent particles as measured with an Abbe refractometer. The refractive index of the transparent particles may be measured as follows. Mixed solvents having any two solvents having different refractive indices at varied mixing ratios to have varied refractive indices are prepared. In each of the mixed solvents are dispersed an equivalent amount of light transmissive particles, and the turbidity of the dispersion is measured. The refractive index of the particles is equal to that of the mixed solvent in which the particles are dispersed with the least turbidity as measured with an Abbe refractometer.

The amount of the transparent particles to be used is preferably 0.1 to 5.0 g/m$^2$, more preferably 0.2 to 3.0 g/m$^2$, even more preferably 0.3 to 2.0 g/m$^2$, to obtain a desired surface profile.

The transparent particles may be either organic or inorganic. Examples of the inorganic particles are silica and alumina, such as the spherical silica and the spherical alumina available from Micron Co., Ltd.

Examples of the organic particles include poly(meth-acrylic acid-methyl acrylate) resins, acrylic styrene resins, polymethyl methacrylate resins, silicone resins, polystyrene resins, polycarbonate resins, benzoguanamine resins, melamine resins, polyolefin resins, polyester resins, polyamide resins, polyimide resins, and polyfluoroethylene resins. Commercially available organic particles include Chemisnow MX series and SX series (acrylic styrene resins from Soken Chemical & Engineering Co., Ltd.), Techpolymer (acrylic styrene resins from Sekisui Plastics Co., Ltd.), Eposter (benzoguanamine resin from Nippon Shokubai Co., Ltd.), Optbeads (melamine resin from Nissan Chemical Industries, Ltd.), and Tospearl (silicone resin from Momentive Performance Materials Inc.).

Organic particles the expansion coefficient of which is close to that of the transparent base are preferred to secure adhesion to the thermoplastic resin of the transparent base and prevent separation at the interface with the base or fall-off from the base due to humidity or heat. Nearly spherical resin particles are especially preferred.

[VI] Material of Transparent Base

The main component forming the transparent base is preferably a thermoplastic resin. The term "main component" as used herein means a component forming 51% to 99% by mass of the solids content of the transparent base. Examples of useful thermoplastic resins include cellulose acylates (e.g., cellulose triacetate, cellulose diacetate, cellulose propionate, cellulose butyrate, and cellulose acetate propionate), nitrocellulose, polyamides, polycarbonates, polyesters (e.g., polyethylene terephthalate, polyethylene naphthalate, poly(1,4-cyclohexane dimethylene terephthalate), polyethylene 1,2-diphenoxyethane-4,4'-dicarboxylate, and polybutylene terephthalate), polystyrenes (e.g., syndiotactic polystyrene), polyolefins (e.g., polypropylene, polyethylene, polymethylpentene, and polycycloalkanes), polysulfones, polyether sulfones, polyarylates, polyether imides, polymethyl methacrylate, polyether ketones, norbornene resins (e.g., Arton from JSR Corp.), amorphous polyolefins (e.g., Zeonex from Nippon Zeon Co., Ltd.), and (meth)acrylic resins (e.g., Acrypet from Mitsubishi Rayon Co., Ltd. and the cyclic structure-containing acrylic resins described in JP 2004-70296A and JP 2006-171464A). As used herein, the term "(meth)acrylic" or "(meth)acrylate" means at least one of acrylic or methacrylic or at least one of acrylate and methacrylate. Preferred of these thermoplastic resins are cellulose triacetate, cellulose diacetate, cellulose propionate, polyethylene terephthalate, and polyethylene naphthalate.

For use as a transparent protective film of a polarizing plate, the antiglare film of the invention is required to have a good hydrophobic/hydrophilic balance, adhesiveness to a vinyl alcohol-based polarizing film, and uniformity of optical characteristics over the entire film area. From this viewpoint, the transparent base is preferably made mainly of a cellulose fatty acid ester (cellulose acylate), particularly cellulose triacetate, cellulose diacetate, or cellulose propionate.

Figure 5A:
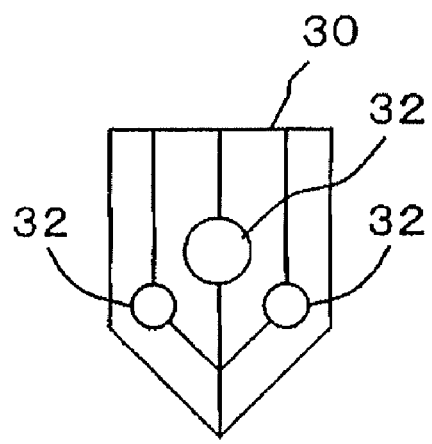
FIG. 5A illustrates a multimanifold co-casting die, and FIG. 5B a feed block co-casting die.
Figure 5B:
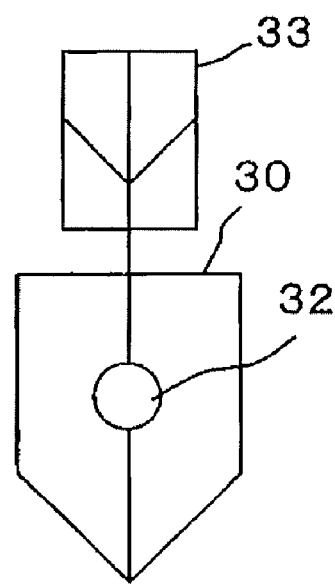
Figure 6:
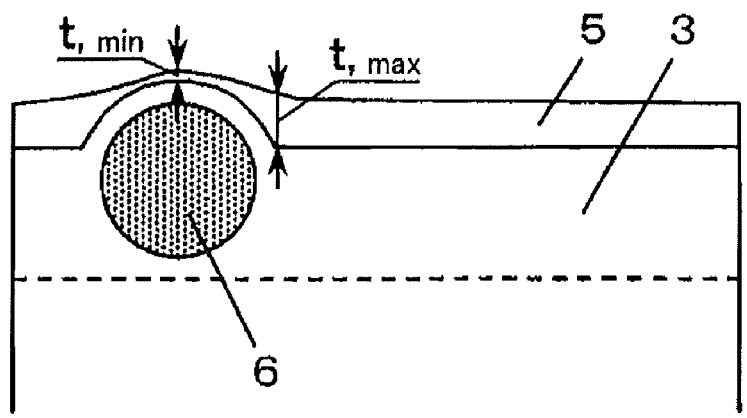
FIG. 6 is a schematic illustration indicating the minimum and the maximum thicknesses of a cured layer.

The transparent base may be made by a multilayer casting method, such as co-casting (simultaneous multilayer casting) or successive casting. In the case of co-casting or successive casting, a plurality of dopes (two or even more) are prepared. Co-casting is a technique in which a plurality of dopes are simultaneously extruded from the respective slits of a casting die onto a casting support (belt or drum), dried to an appropriate degree, released from the support, and dried. The casting die may be either a multimanifold co-casting die illustrated in FIG. 5A or a feed block co-casting die illustrated in FIG. 5B. A vacuum chamber is preferably provided at the tip of the casting die.

Successive casting is a technique in which a first casting dope is extruded from a casting die onto a support, a second dope is then extruded onto the first cast dope, the third and the subsequent dopes, if any, are successively cast thereon, and the successively cast layers are stripped off the support in an appropriate stage and dried. The cast dope may or may not be dried before a subsequent dope is applied. The cast film may be stretched in a given direction after drying and before application of the next dope. In such a case, the cast film is preferably stretched about 0.9 to 1.5 times in the longitudinal direction and/or transverse direction.

The transparent base may also be made by extrusion molding in which a molten thermoplastic resin containing the transparent particles is extruded, and the extruded film is stretched. The extruded film is preferably stretched biaxially, 1.0 to 2.0 times in a first direction and 1.5 to 7.0 times in a second direction perpendicular to the first direction. More preferably, the extruded film is stretched 1.1 to 1.8 times in the longitudinal direction and 3.0 to 5.0 times in the transverse direction. Such biaxial stretching at the stretch ratios recited easily causes the transparent particles to make protrusions on the surface of the film.

As described, the transparent base may be made by any of co-casting, successive casting, and extrusion molding. Nevertheless, co-casting is a preferred method for the following reasons. Successive casting generally involves complicated steps and extensive equipment and has difficulty in maintaining the planarity of the film. In contrast, co-casting involves simple steps and achieves high productivity. Extrusion molding using a molten resin containing no solvent can cause a problem due to partially poor melting, which depends on the resin material.

Figure 1B:
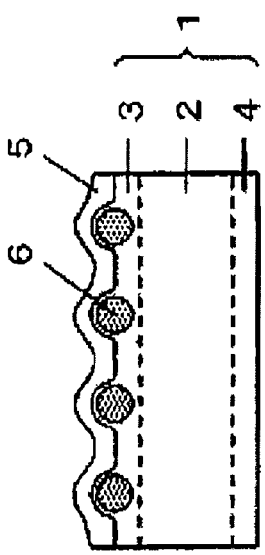
Figure 1A:
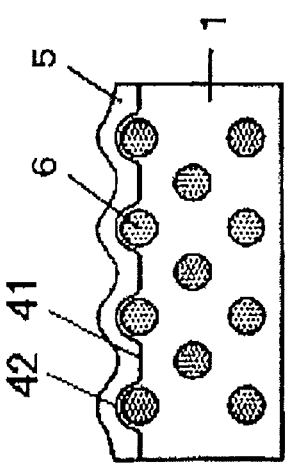
Figure 2A:
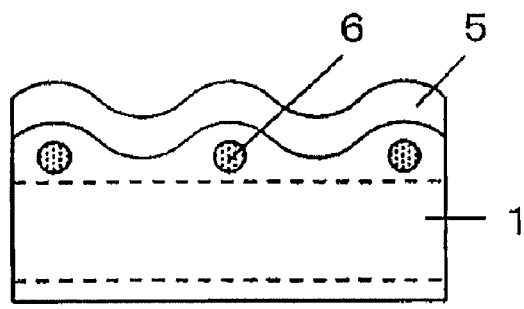
FIG. 2A and FIG. 2B each illustrate an example of conventional antiglare films.
Figure 2B:
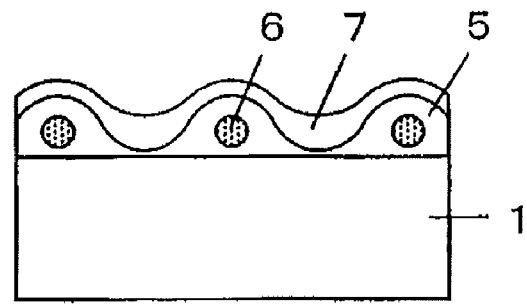

In the step of making a transparent base, it is preferred that at least two dopes be cast either simultaneously or successively and that the transparent particles be contained in the dope adapted to form a layer adjacent to the cured layer (see FIG. 1B). For example, a transparent base 1 illustrated in FIG. 1B has a basal layer 2, a first surface layer 3, and a second surface layer (back layer) 4. Only the first surface layer 3 contains transparent particles 6. A cured layer 5 is provided on the first surface layer 3.

In co-casting, it is preferred for a dope containing transparent particles to form the outermost layer of the transparent base. That is, the particle-containing dope is preferably the first to be cast to form a layer in contact with a casting support or the last to be cast to form an outermost layer facing air. It is more preferred in view of releasability from the support that the particle-containing dope layer be on the side facing air. The temperature of the support is preferably not higher than 20° C. so that the cast dope may not level in the initial stage of casting. It is also preferred for the support to have a temperature of 0° C. or lower so that the cast dope may be chilled and gelled.

The transparent base is preferably composed of regions with different contents of the transparent particles, the regions being stacked in the thickness direction. A region with a high content of the particles is preferably located nearer to the surface on which the cured layer is provided than to the opposite side surface (surface B of the antiglare film). The surface of the base on which the cured layer is provided (i.e., the surface opposite to surface B of the antiglare film) will hereinafter be referred to as the surface A-side surface. A region with a high content of the particles is preferably from surface A-side surface up to 90% of the thickness, more preferably from surface A-side surface up to 75% of the thickness, even more preferably from surface A-side surface up to 50% of the thickness. It is also preferred that the particles be absent in a region from the surface A-side surface to 25% of the thickness. In other words, it is particularly preferred that the particles be concentrated in a region disposed anywhere between 25% and 50% of the thickness from surface A to obtain the specific surface profile of the invention. Such localization of particles at a specific depth is achieved by casting a plurality of dopes having different particle contents either simultaneously or successively or co-extruding a plurality of molten resins having different particle contents. As long as delamination does not occur, the thermoplastic resins of the layers may be different from each other. For instance, dopes of cellulose acylates having different substituents or different degrees of substitution may be stacked.

The thickness of the transparent base is preferably 20 to 200 μm, more preferably 20 to 80 μm, even more preferably 25 to 50 μm. When the transparent base is made by co-casting dopes, the ratio of the thickness of a surface dope (or the total thickness of the first and second surface dopes) to the thickness of a basal dope, (surface dope thickness/basal dope thickness)×100, is preferably 0.25% to 50%, more preferably 0.6% to 40%. The surface dope thickness of 0.25% or more secures formation of a uniform layer. The basal dope thickness of 50% or less provides a stable interface between dopes, causing little impairment of the surface conditions. As used herein, the term "thickness of dope" or "dope thickness" denotes the thickness after solvent volatilization. The terms "surface dope" and "basal dope" refer to dopes (a thermoplastic resin dissolved in a solvent) in the form of a surface layer and a basal layer, respectively, as cast through a casting die in contact with each other. These terms do not necessarily mean the existence of an interface in the transparent base obtained after solvent removal. Therefore, the interfaces between dopes are indicated by dotted lines in FIGS. 1A to 1C and FIG. 2A.

The transparent base for use in the invention is preferably made of a cellulose acylate as stated previously. Particularly preferred cellulose acylates are cellulose esters with carboxylic acids having 2 to 22 carbon atoms, such as alkylcarbonyl esters, alkenylcarbonyl esters, cycloalkylcarbonyl esters, aromatic carbonyl esters, and aromatic alkylcarbonyl esters, each of which may have a substituent.

The C2-C22 acyl group of the cellulose acylate may be either aliphatic or aromatic. Examples of preferred C2-C22 acyl groups include, but are not limited to, acetyl, propionyl, butanoyl, heptanoyl, hexanoyl, octanoyl, cyclohexanecarbonyl, adamantanecarbonyl, phenylacetyl, benzoyl, naphthylcarbonyl, (meth)acryloyl, and cinnamoyl. More preferred of them are acetyl, propionyl, butanoyl, pentanoyl, hexanoyl, cyclohexanecarbonyl, phenylacetyl, benzoyl, and naphthylcarbonyl.

The cellulose acylate suited for use in the invention satisfies relationships (4) and (5):

$$2.3 \leq SA' + SB' \leq 3.0 \quad (4)$$

$$0 \leq SA' \leq 3.0 \quad (5)$$

where SA' is the degree of substitution (of the hydrogen atom of the hydroxyl groups of cellulose) with an acetyl group (hereinafter referred to as SA); and SB' is the degree of substitution with a C3-C22 acyl group (hereinafter referred to as SB).

Cellulose is composed of β-1,4-bonded glucose units each having free hydroxyl groups at the 2-, 3-, and 6-positions. A cellulose acylate is derived by esterifying some or all of the free hydroxyl groups with an acyl group. By the term "degree of substitution with acyl" is meant the ratio of acyl-esterified hydroxyl groups to all the free hydroxyl groups at each of the 2-, 3-, and 6-positions. When all the hydroxyl groups at the 2-, 3-, or 6-position of glucose units are esterified, the degree of substitution at that position is 1. In the invention the sum of the degree of substitution with SA and that with SB (i.e., SA'+SB') is more preferably 2.6 to 3.0, even more preferably 2.70 to 3.00. The degree of substitution with SA (i.e., SA') is more preferably 1.4 to 3.0, even more preferably 2.3 to 2.9.

The SB, i.e., the C3-C22 acyl group displacing the hydrogen atom of the hydroxyl group, is preferably an acyl group having three or four carbon atoms. It is preferred for the cellulose acylate satisfying relationships (4) and (5) to satisfy relationship (6):

$$0 \leq SB'' \leq 1.2 \quad (6)$$

where SB" is the degree of substitution with an acyl group having three or four carbon atoms.

The degree of substitution is obtained by calculation from the degree of bonding of a fatty acid to the hydroxyl groups of cellulose as determined in accordance with ASTM D817-91 and ASTM 0817-96. The state of an acyl group displacing a hydroxyl group is determined by $^{13}C$ NMR analysis.

The polymer component of the transparent base is preferably substantially composed of a cellulose acylate satisfying relationships (4) and (5) described supra. By the term "substantially" as used here is meant that at least 55% by mass (preferably 70% by mass or more, more preferably 80% by mass or more) of the total polymer component is the cellulose acylate. Two or more cellulose acylates may be used in combination.

The cellulose acylate that is preferably used in the invention has a viscosity average degree of polymerization of 200 to 700, preferably 230 to 550, more preferably 230 to 350, even more preferably 240 to 320. The viscosity average degree of polymerization is determined by the intrinsic viscosity method by Uda et al. (Kazuo Uda and Hideo Saito, *Sen'i Gakkaishi*, vol. 18, No. 1, pp. 105-120, 1962). For the details of the method, refer to JP 9-95538A.

The cellulose acylate preferably has a number average molecular weight Mn of $7 \times 10^4$ to $25 \times 10^4$, more preferably $8 \times 10^4$ to $15 \times 10^4$, and a molecular weight distribution expressed by the ratio of weight average molecular weight Mw to Mn, Mw/Mn, of 1.0 to 5.0, more preferably 1.0 to 3.0. The average molecular weights Mn and Mw are determined by HPLC, from which is calculated the molecular weight distribution Mw/Mn.

[VII] Additives and Solvent for Transparent Base

[VII-1] Plasticizer

The transparent base may contain a plasticizer to have flexibility, improved dimensional stability, and improved moisture resistance.

In using a cellulose acylate as a main polymer material of the transparent base, a plasticizer having an octanol water partition coefficient (log P) of 0 to 10 is particularly preferred. A plasticizer having a log P of 10 or smaller has good compatibility to a cellulose acylate and therefore invites no troubles, such as cloudiness or chalking of the film. A plasticizer having a log P of 0 or greater is not too hydrophilic to cause adverse effects, such as deterioration of water resistance of the cellulose acylate film. The log P of a plasticizer is more preferably 1 to 8, even more preferably 2 to 7.

The octanol water partition coefficient (log P) is determined by the shake-flask method specified in JIS Z7260-107 (2000). The octanol water partition coefficient (log P) may be estimated by a computational chemical prediction method or an empirical prediction method instead of actual measurement. Available computation methods include Crippen's fragmentation method as described in *J. Chem. Inf. Comput. Sci.*, vol. 27, p. 21 (1987), Viswanadhan's method as disclosed in *J. Chem. Inf. Comput. Sci.*, vol. 29, p. 163 (1989), and Broto's fragmentation method as disclosed in *Eur. J. Med. Chem.-Chim. Theord.*, vol. 19, p. 71 (1984), with the Crippen's fragmentation method being preferred. In the case where the log p value of a compound differs depending on the method of measurement or computation, it is advisable to determine whether the log P of the compound is in the range recited above by the Crippen's fragmentation method.

Examples of preferred plasticizers include low molecular to oligomeric compounds, such as phosphoric esters, carboxylic esters, and polyol esters, with a log P within the range recited and a molecular weight of about 190 to 5000.

Examples of the phosphoric esters include triphenyl phosphate (TTP), tricresyl phosphate, cresyldiphenyl phosphate, octyldiphenyl phosphate, diphenylbiphenyl phosphate, trioctyl phosphate, and tributyl phosphate.

The carboxylic esters are typified by phthalic esters and citric esters. Examples of the phthalic esters include dimethyl phthalate, diethyl phthalate, dibutyl phthalate, dioctyl phthalate, diphenyl phthalate, and diethyl hexyl phthalate. Examples of the citric esters include O-acetyl triethyl citrate, O-acetyl tributyl citrate, acetyl triethyl citrate, and acetyl tributyl citrate.

These preferred plasticizers, except TTP having a melting point of about 50° C., are liquid at 25° C. and have a boiling point of 250° C. or higher.

These plasticizers may be used either individually or as a mixture of two or more thereof. The amount of the plasticizer to be added is preferably 2 to 30 parts, more preferably 5 to 20 parts, by mass per 100 pats by mass of the cellulose acylate. The layer containing the transparent particles preferably has an increased amount of the plasticizer to improve the affinity between the cellulose acylate and the particles and to reduce brittleness.

[VII-2] UV Absorber

It is advisable to add a UV absorber to the transparent base to improve light resistance of the film per se or to protect an image display member, such as a polarizing plate and a liquid crystal compound of an LCD, from deterioration by UV light.

In order to prevent a liquid crystal compound from deterioration while securing liquid crystal display qualities, UV absorbers that effectively absorb UV light of 370 nm or shorter wavelengths but absorb as little visible light of 400 nm or longer wavelengths as possible are preferred. In particular, UV absorbers having a transmittance of 20% or less, preferably 10% or less, more preferably 5% or less, at 370 nm are suitable. Examples of such preferred UV absorbers include, but are not limited to, hydroxybenzophenone compounds, benzotriazole compounds, salicylic ester compounds, benzophenone compounds, cyanoacrylate compounds, and nickel complex compounds as well as polymers having the UV absorbing groups of the above listed UV absorbing compounds. These UV absorbers may be used as a mixture of two or more thereof.

The amount of the UV absorber to be added is 0.1 to 5.0 parts, preferably 0.5 to 4.0 parts, more preferably 0.8 to 2.5 parts, by mass per 100 parts by mass of the thermoplastic resin of the transparent base.

[VII-3] Other Additives

The composition (dope) forming the transparent base may further contain various other additives as appropriate to the use of the resulting antiglare film, such as deterioration inhibitors (e.g., antioxidants, peroxide decomposers, radical inhibitors, metal deactivators, acid scavengers, and amines), optical anisotropy controlling agents, release aids, antistatic agents, and IR absorbers. The additives may be either solid or oily. In other words, the additives are not limited by their melting point or boiling point. Useful IR absorbers are described, e.g., in JP 2001-194522A.

These additives may be added at any stage during dope preparation. Otherwise, a step of adding an additive(s) may be provided as a final stage of dope preparation. The amount of each additive is not particularly limited as long as the expected effect is manifested. Where the transparent base has a multilayer structure, the kinds and amounts of the additives may differ between layers. The techniques relating to usage of these additives in optical films are known from, for example, JP 2001-151902A. For further information about preferred materials of the additives including the UV absorbers, reference may be made to *Journal of Technical Disclosure*, No. 2001-1745, pp. 16-22, issued on 2001 Mar. 15 by Japan Institute of Invention and Innovation.

These additives are preferably added in an amount of 0.001% to 20% by mass relative to the total mass of the composition making up the transparent base.

[VII-4] Solvent

The organic solvent that is used to dissolve the material forming the transparent base may be chosen from known organic solvents, preferably those having a solubility parameter of 17 to 22. "Solubility parameter" is described, e.g., in J. Brandrup, E. H. Immergut, et al. (Eds.), *Polymer Handbook*, 4th ed., p. VII 671 to VII 714. Examples of the organic solvents having a solubility parameter in the range recited above include lower aliphatic hydrocarbon chlorides, lower aliphatic alcohols, C3-C12 ketones, C3-C12 esters, C3-C12 ethers, C5-C8 aliphatic hydrocarbons, C6-C12 aromatic hydrocarbons, and fluoroalcohols (e.g., the compounds described in JP 8-143709A, para. 0020 and JP 11-60807A, para. 0037).

The material forming the transparent base is preferably dissolved in the organic solvent in a concentration of 10% to 30%, more preferably 13% to 27%, even more preferably 15% to 25%, by mass. A predetermined concentration within that range may be obtained at the time of dissolving the material in the solvent, or a low concentration (e.g., 9 to 14 mass %) solution is once prepared and then concentrated to a predetermined concentration in a concentration step as described later, or a high concentration solution is once prepared and then diluted to a predetermined concentration by addition of various additives.

The solvents may be used either individually or as a mixture of two or more thereof.

[VIII] Preparation of Dope

The solution (dope) of the material forming the transparent base, such as a cellulose acylate, is prepared by any method, for example, a room-temperature dissolving method, a cooling dissolving method, a high-temperature dissolving method, or a combination thereof. For the details of cellulose acylate solution preparation, reference may be made to JP 5-163301A, JP 61-106628A, JP 58-127737A, JP 9-95544A, JP 10-95854A, JP 10-45950A, JP 2000-53784A, JP 11-322946A, JP 11-322947A, JP 2-276830A, JP 2000-273239A, JP 11-71463A, JP 4-259511A, JP 2000-273184A, JP 11-323017A, and JP 11-302388A. The methods of dissolving a cellulose acylate in an organic solvent disclosed in these publications are applicable to the preparation of the dope for use in the invention within the scope of the invention. For further information to carry out the dope preparation, particularly dope preparation using a chlorine-free solvent system, refer to *Journal of Technical Disclosure*, No. 2001-1745, pp. 22-25. Preparation of a cellulose acylate dope usually involves solution concentration and filtration steps, the details of which are also described in ibid, p. 25. In the case of the high-temperature dissolving method, a cellulose acylate, in most cases, is dissolved in an organic solvent at a temperature at or above the boiling point of the solvent, in which cases the dissolving operation is carried out under pressure.

[IX] Cured Layer

[IX-1] Curing Compound

The cured layer of the antiglare film of the invention is formed using a coating solution containing at least a curing compound (binder) and a polymerization initiator. The curing compound is preferably a heat and/or ionizing radiation curable compound, and the cured layer is preferably formed through the crosslinking reaction or polymerization reaction of such a compound. The binder may be a monomer binder or a polymer binder.

[IX-2] Monomer Binder

The monomer binder is preferably a heat and/or ionizing radiation curing, polyfunctional monomer or oligomer. Inter alia, an ionizing radiation curing compound is preferred in terms of productivity and space saving.

The functional group of the ionizing radiation curing polyfunctional monomer or oligomer is preferably polymerizable on exposure to light, an electron beam, or a radiation. A light (photo) polymerizable functional group is particularly preferred. Examples of photopolymerizable functional groups include unsaturated polymerizable functional groups, such as (meth)acryloyl, vinyl, styryl, and allyl, with (meth)acryloyl being preferred.

Specific examples of the photopolymerizable polyfunctional monomer having a photopolymerizable functional group are given, e.g., in JP 2007-268753A, paras. 0018 to 0020.

Monomer binders having different refractive indices may be used to control the refractive index characteristics of each layer. Examples of high refractive index monomers, in particular, include bis(4-methacryloylthiophenyl) sulfide, vinylnaphthalene, vinylphenyl sulfide, 4-methacryloxyphenyl 4'-methoxyphenyl thioether, and bisarylfluorene acrylate monomers.

Dendrimers such as described in JP 2005-76005A and JP 2005-36105A and norbornene ring-containing monomers such as disclosed in JP 2005-60425A are also useful.

The polyfunctional monomers may be used either individually or as a combination of two or more thereof.

Polymerization of the above described monomer having an ethylenically unsaturated group is effected by exposure to an ionizing radiation in the presence of a photo radical initiator or heating in the presence of a thermal radical initiator.

Polymerization of the photopolymerizable polyfunctional monomer is preferably carried out using a photopolymerization initiator, suitably a photo radical polymerization initiator or a photo cation polymerization initiator. A photo radical polymerization initiator is particularly preferred.

[IX-3] Crosslinking Polymer Binder

A polymer having a reactive group is also useful as a curing compound (binder). For the details of the polymer having a reactive group, reference can be made to JP 2007-268753A, paras. 0024 to 0030.

[IX-4] Polymerization Initiator

As stated above, polymerization of the monomer having an ethylenically unsaturated group is effected by exposure to an ionizing radiation in the presence of a photo radical initiator or heating in the presence of a thermal radical initiator.

A photopolymerization initiator and a thermal polymerization initiator may be used in combination in making the antiglare film of the invention.

For further information about polymerization initiators and usage thereof, reference may be made to JP 2007-268753A, para. 0073 to 0089.

[IX-5] Other Additives of Cured Layer

The cured layer may contain particles as illustrated in FIG. 1C to have its surface profile and optical characteristics controlled within preferred ranges. For example, the antiglare film of FIG. 1C includes a three-layered transparent base 1 and a cured layer 5 containing particles 43. The transparent base 1 is composed of a basal layer 2, a first surface layer 3 on which the cured layer 5 is provided, and a second surface layer (back layer) 3, formed of three kinds of dopes. Only the first surface layer 3 of the transparent base 1 contains transparent particles 6. The particles incorporated into the cured layer are preferably organic or inorganic particles with a particle size of 5 nm to 2.5 μm, more preferably inorganic particles with a particle size of 5 nm to 1.5 μm. The particles may be amorphous (the particles may include secondary agglomerates) or may have a flattened shape as long as they do not cause unnecessary large angle scattering.

The antiglare film having the cured layer preferably has a pencil hardness of H or higher, more preferably 2H or higher.

For use as a protective film adhered to a polarizing film to make a polarizing plate, the antiglare film of the invention is preferably subjected to a surface treatment for hydrophilization, such as acid treatment, alkali treatment, plasma treatment, or corona treatment, to provide enhanced adhesion to a polarizing film.

In terms of adhesion, surface B of the transparent base preferably has a surface energy of 55 mN/m or more, more preferably 60 to 75 mN/m. The surface energy of surface B is adjustable within that range by the above described surface treatment.

[X] Polarizing Plate

[X-1] Structure of Polarizing Plate

A polarizing plate includes a polarizing film and a protective film disposed on at least one side of the polarizing film. The antiglare film of the invention is suited for use as the protective film of such a polarizing plate. In making a polarizing plate, the antiglare film of the invention is used with its surface A facing outward and its surface B facing the polarizing film to enjoy the optical characteristics as contemplated by the invention. Use of the antiglare film of the invention as a protective film reduces the cost of producing a polarizing plate. By using the antiglare protective film of the invention on a backlight side of a polarizing film provided in a backlight side of the liquid crystal cell, reduction of Moire and brightness nonuniformity and prevention of front contrast reduction are both achieved.

In making a polarizing plate having a protective film on both sides of a polarizing film, the protective film on opposite side from the antiglare film of the invention may be an ordinary cellulose acetate film or a retardation film. The protective film on opposite side from the antiglare film of the invention may be an optical compensation film having an optically anisotropic layer of a liquid crystal compound, which is a preferred embodiment of the polarizing plate of the invention.

[X-2] Polarizing Film

The polarizing film may be of iodine, dichroic, or polyene type. A polarizing film of iodine or dichroic type is generally obtained using a polyvinyl alcohol-based film.

The polarizing film may be any known polarizer or may be a polarizer cut from a continuous polarizing film the absorption axis of which is neither parallel nor perpendicular to the longitudinal direction. A continuous polarizing film is produced as follows. A web of polymer film (e.g., polyvinyl alcohol-based film) is continuously fed. Both edges of the web are secured to the respective securing means and pulled in opposite directions to be transversely stretched 1.1 to 20.0 times while making a difference of moving speed between the securing means on opposite sides within 3% such that the moving direction of the web makes an angle of 20° to 70° with the substantial stretching direction at the outlet of the step of securing the web edges. The angle discussed above is preferably 45° in terms of productivity.

[X-3] Optical Compensation Film

As stated, the protective film on opposite side from the antiglare film of the invention may be an optical compensation film having an optically anisotropic layer of a liquid crystal compound, which is a preferred embodiment of the polarizing plate of the invention. To use an optical compensation film (retardation film) improves viewing angle characteristics of an LCD panel.

While any known optical compensation film is useful, the film disclosed in JP 2001-100042 is recommended in terms of viewing angle enhancement.

[XI] Contemplated Mode of Use of the Invention

The antiglare film and the polarizing plate provided by the invention are suited for applications to image display devices, such as LCDs, plasma display panels, electroluminescent displays, and cathode ray tube displays.

The antiglare film and the polarizing plate provided by the invention are especially suited to be disposed on either one or both of the viewer's side and the backlight side of a liquid crystal cell of a transmissive or semi-transmissive LCD.

In general, an LCD includes a liquid crystal cell and a polarizing plate disposed on each side of the liquid crystal cell. The liquid crystal cell includes two electrode layers and a liquid crystal held therebetween. An LCD can further include an optically anisotropic layer between the liquid crystal cell and one of, or each one of, the polarizing plates.

The liquid crystal cell is preferably of TN mode, VA mode, OCB mode, IPS mode, or ECB mode.

EXAMPLES

The invention will now be illustrated in greater detail with reference to Examples.

[A] Preparation of Transparent Base

Dopes A to O were prepared according to the formulations of Table 1. Transparent bases 1 through 17 were prepared by co-casting three different dopes to make a surface dope/basal dope/surface dope structure as shown in Table 2. The solid content of the dope for a basal layer (dope B) and the solid content of the dopes for surface layers (dopes A and C to O) were adjusted to 23 mass % and 18 mass %, respectively, with a 90/10 by mass mixed solvent of methylene chloride and methanol. The refractive index of the particles used in the dopes was measured as described supra.

Figure 3:
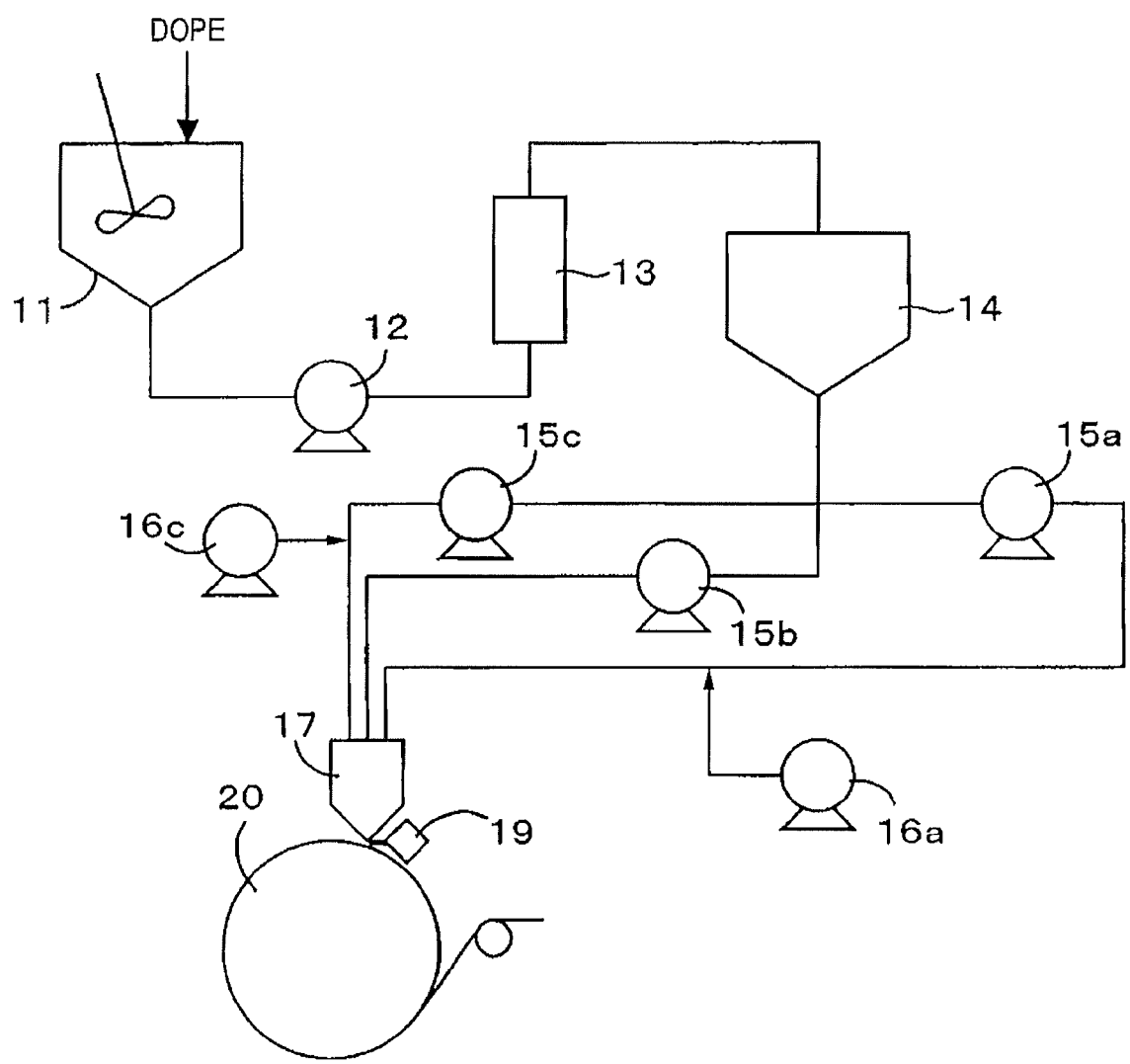
FIG. 3 is a schematic illustration of solvent casting equipment having a casting drum.

Transparent bases 1 to 15 and 17 were made using the casting equipment illustrated in FIG. 3, which had a mirror finished casting drum cooled to −10° C. The three dopes were co-cast with the dope for surface layer 1 in contact with the rotating drum, chilled by the drum to a gel while volatilizing the solvent, and stripped off the drum. The resulting web was dried with hot air at 100° C. to a residual solvent content of 10 mass % and then with hot air at 140° C. for 10 minutes. Transparent base 16 was made using the casting equipment illustrated in FIG. 4, which had a mirror finished endless belt maintained at 18° C. The three dopes were co-cast with the dope for surface layer 1 in contact with the moving belt and dried in the same manner as described above. All the resulting transparent bases had a refractive index of 1.48.

The surface profile and the maximum height Rt of the transparent bases 1 to 17 are shown in Table 2. The method of evaluating the surface profile of the transparent base will be described later.

TABLE 1

| Formulation (part by mass) | Dope | | | | | | | | | | | | | | |
|---|---|---|---|---|---|---|---|---|---|---|---|---|---|---|---|
| | A | B | C | D | E | F | G | H | I | J | K | L | M | N | O |
| CTA | 100 | 100 | 100 | 100 | 100 | 100 | 100 | 100 | 100 | 100 | 100 | 100 | 100 | 100 | 100 |
| TPP | 8 | 8 | 8 | 8 | 8 | 8 | 8 | 8 | 8 | 8 | 8 | 8 | 8 | 8 | 8 |
| DBP | 4 | 4 | 4 | 4 | 4 | 4 | 4 | 4 | 4 | 4 | 4 | 4 | 4 | 4 | 4 |
| UV Absorber | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Fine Particles | | | | | | | | | | | | | | | |

TABLE 1-continued

| Formulation (part by mass) | | Dope | | | | | | | | | | | | | | |
|---|---|---|---|---|---|---|---|---|---|---|---|---|---|---|---|---|
| | | A | B | C | D | E | F | G | H | I | J | K | L | M | N | O |
| Kind | Refractive Index | | | | | | | | | | | | | | | |
| R972 | 1.47 | 0.1 | | 10.0 | | | | | | | | | | | | |
| S431 | 1.47 | | | | 10.0 | | | | | | | | | | | |
| 2000M | 1.65 | | | | | 10.0 | | | | | | | | | | |
| KEP-150 | 1.47 | | | | | | 15.0 | | | | | | | | | |
| MX-350 | 1.50 | | | | | | | 15.0 | | | | | | | | |
| MX-675 | 1.50 | | | | | | | | 15.0 | | | | | | | |
| SKK-60MS | 1.55 | | | | | | | | | 15.0 | | | | | | |
| SKK-80M | 1.50 | | | | | | | | | | 5.0 | 15.0 | | | | |
| SKK-80MS | 1.52 | | | | | | | | | | | | 15.0 | | | |
| SKK-100M | 1.50 | | | | | | | | | | | | | 15.0 | | |
| NX-1500 | 1.50 | | | | | | | | | | | | | | 15.0 | |
| TP-1110 | 1.44 | | | | | | | | | | | | | | | 15.0 |

TABLE 2

Figure 4:
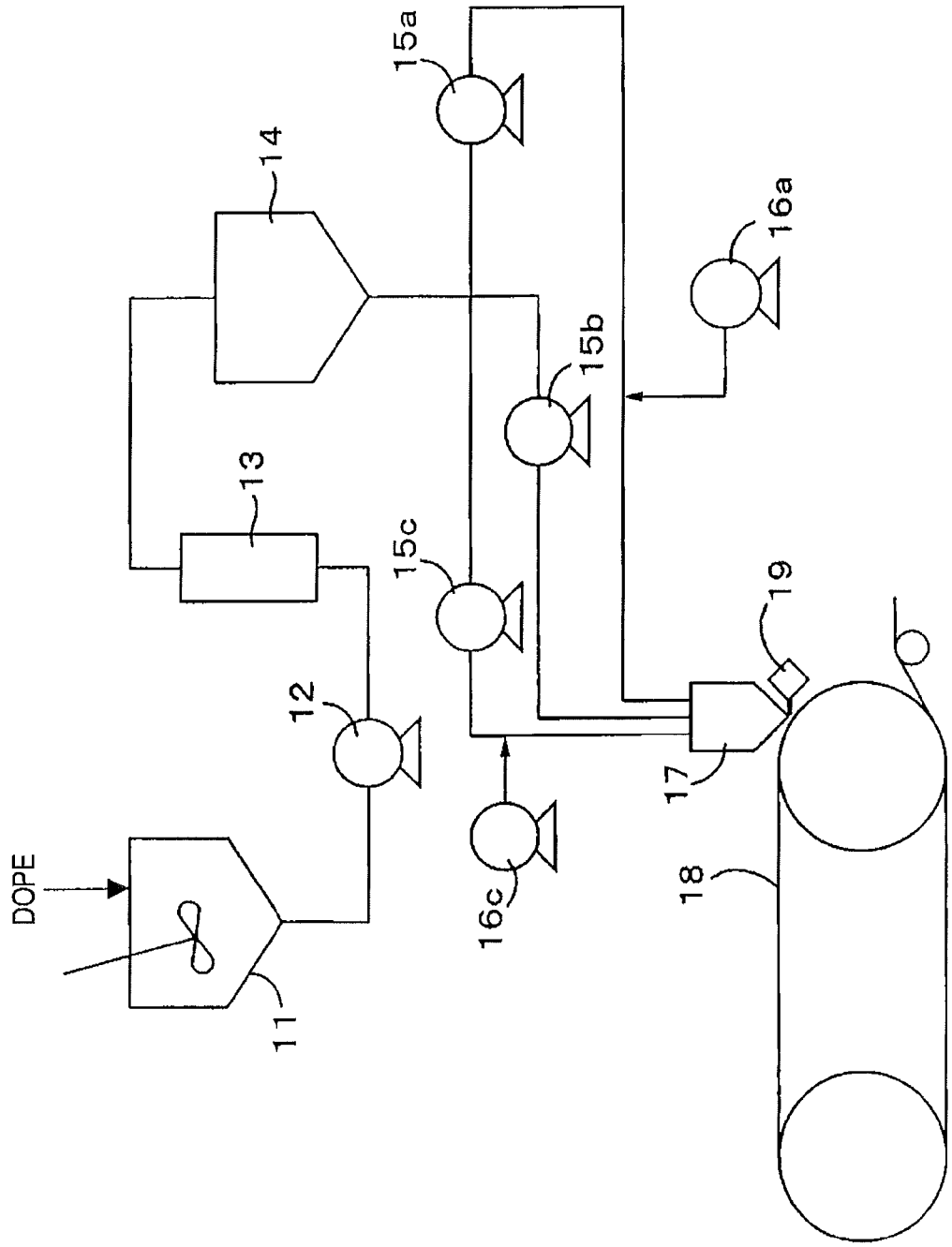
FIG. 4 is a schematic illustration of solvent casting equipment having a casting belt.

| Base No. | Dope Formulation | | | Thickness (μm) | | | Casting Equipment | Surface Profile | Rt (μm) |
|---|---|---|---|---|---|---|---|---|---|
| | Surface Layer 1 | Basal Layer | Surface Layer 2 | Surface Layer 1 | Basal Layer | Surface Layer 2 | | | |
| 1 | A | B | C | 3 | 34 | 5 | FIG. 3 | bad (random) | 0.5 |
| 2 | A | B | D | 3 | 34 | 5 | FIG. 3 | bad (wavy) | 1.5 |
| 3 | A | B | E | 3 | 34 | 5 | FIG. 3 | medium | 0.8 |
| 4 | A | B | F | 3 | 34 | 5 | FIG. 3 | medium | 0.6 |
| 5 | A | B | G | 3 | 34 | 5 | FIG. 3 | good | 1.8 |
| 6 | A | B | H | 3 | 52 | 5 | FIG. 3 | good | 3.5 |
| 7 | A | B | I | 3 | 34 | 5 | FIG. 3 | good | 3.7 |
| 8 | A | B | J | 3 | 29 | 10 | FIG. 3 | good | 3.6 |
| 9 | A | B | K | 3 | 31.5 | 7.5 | FIG. 3 | good | 4.8 |
| 10 | A | B | L | 3 | 29.5 | 7.5 | FIG. 3 | good | 4.6 |
| 11 | A | B | L | 3 | 32 | 5 | FIG. 3 | good | 4.3 |
| 12 | A | B | L | 3 | 33.7 | 3.3 | FIG. 3 | good | 4.2 |
| 13 | A | B | M | 3 | 31 | 8 | FIG. 3 | good | 7.3 |
| 14 | A | B | N | 3 | 31 | 11 | FIG. 3 | good | 12 |
| 15 | A | B | A | 3 | 32 | 5 | FIG. 3 | bad (flat) | 0.1 |
| 16 | A | B | H | 3 | 52 | 5 | FIG. 4 | good | 3.2 |
| 17 | A | B | O | 3 | 37 | 10 | FIG. 3 | good | 8.1 |

Abbreviations used in Table 1 and the materials shown in Table 1 are explained below.

CTA: cellulose triacetate (degree of substitution with acetyl: 2.86; viscosity average degree of polymerization: 310)
TPP: triphenyl phosphate
BDP: biphenyl diphenyl phosphate
UV absorber: benzotriazole UV absorber (20/80 mass % mixture of Tinuvin 326 and Tinuvin 328 both available from Ciba Japan)
R972: Aerosil R972 from Nippon Aerosil Co., Ltd.; primary particle size: ca. 16 nm
S431: Slysia 431 from Fuji Silysia Chemical Ltd.; average particle size: ca. 2.5 μm
KEP-150: Seahoster KEP-150, true spherical silica particles from Nippon Shokubai Co., Ltd.; average particle size: 2.5 μm
2000M: Optbeads 2000M, true spherical melamine resin particles from Nissan Chemical Industries, Ltd.; average particle size: 2.0 μm
MX-350: crosslinked polymethyl methacrylate true spherical particles from Soken Chemical & Engineering Co., Ltd.; average particle size: 3.5 μm
MX-675: crosslinked polymethyl methacrylate true spherical particles from Soken Chemical & Engineering Co., Ltd.; average particle size: 6 μm
MX-1500: crosslinked polymethyl methacrylate true spherical particles from Soken Chemical & Engineering Co., Ltd.; average particle size: 20 μm
SKK-80M: crosslinked polymethyl methacrylate true spherical particles from Sekisui Plastics Co., Ltd.; average particle size: 8 μm
SKK-60MS: crosslinked polymethyl methacrylate-styrene copolymer true spherical particles from Sekisui Plastics Co., Ltd.; average particle size: 6 μm
SKK-100M: crosslinked polymethyl methacrylate true spherical particles from Sekisui Plastics Co., Ltd.; average particle size: 10 μm
SKK-80MS: crosslinked polymethyl methacrylate-styrene copolymer true spherical particles from Sekisui Plastics Co., Ltd.; average particle size: 8 μm
TP-1110: Tospearl (silicone resin particles) from Momentive Performance Materials Inc., Japan

[B] Preparation of Coating Solution for Curing Resin Layer

Coating solutions A through H were prepared according to the formulations shown in Table 3. Materials used were as follows.

PET-30: mixture of pentaerythritol triacrylate and pentaerythritol tetraacrylate, available from Nippon Kayaku Co., Ltd.
DPHA: mixture of dipentaerythritol hexaacrylate and dipentaerythritol pentaacrylate, from Nippon Kayaku Co., Ltd.
R972: Aerosil R972 from Nippon Aerosil Co., Ltd.; primary particle size: ca. 16 nm
S431: Slysia 431 from Fuji Silysia Chemical Ltd.; average particle size: ca. 2.5 μm
Ethocel 200: Ethocel 200 Industrial (ethyl cellulose) from Dow Chemical Co.
PMMA: polymethyl methacrylate having an average molecular weight of 350,000
ACA320: Cyclomer P (ACA 320) (acid group-containing acrylate polymer) from Daicel Chemical Industries, Ltd.
Irg-127: Irgacure 127, a photopolymerization initiator from Ciba Specialties Chemicals
CAB: CAB-381-2 (cellulose acetate butyrate) from Eastman Chemical Products, Inc.
Cymel 303: methylolmelamine curing resin from Japan Cytec Industries, Inc.
Catalyst 4050: thermal acid generator solution (55%) from Japan Cytec Industries, Inc.
Coronate L solution: Coronate L (ethyl acetate solution of a polyisocyanate, from Nippon Polyurethane Industry Co., Ltd.) diluted with MEK to a solid content of 50%
TEDA: triethylenediamine (or 1,4-diazabicyclo[2.2.2]octane), a catalyst for urethane curing
MEK: methyl ethyl ketone
MIBK: methyl isobutyl ketone
PGM: propylene glycol monomethyl ether (or 1-methoxy-2-propanol)

TABLE 3

| Formulation (mass %) | Coating Solution | | | | | | | |
|---|---|---|---|---|---|---|---|---|
| | A | B | C | D | E | F | G | H |
| Solid Material: | | | | | | | | |
| PET-30 | 15.5 | 14.7 | 14.6 | 15.0 | 14.7 | | | |
| DPHA | 3.9 | 3.7 | 3.6 | 3.8 | 3.7 | | | |
| R972 | | 1.0 | | | | | | |
| S431 | | | 1.2 | | | | | |
| Ethocel 200 | | | | 0.6 | | | | |
| PMMA | | | | | 1.0 | | | |
| ACA320 | | | | | | 38.0 | | |
| Irg-127 | 0.6 | 0.6 | 0.6 | 0.6 | 0.6 | 1.0 | | |
| CAB | | | | | | | 11.0 | |
| Cymel 303 | | | | | | | | 18.0 |
| Catalyst 4050 | | | | | | | | 3.6 |
| Coronate L Solution | | | | | | | 18.0 | |
| TEDA | | | | | | | 0.05* | |
| Solvent: | | | | | | | | |
| MEK | 24 | 24 | 24 | 24 | 24 | 24 | 15 | 24.0 |
| MIBK | 56 | 56 | 56 | 56 | | | 56 | 54.4 |
| Toluene | | | | | 56 | | | |
| PGM | | | | | | 37 | | |

Note:
*Added immediately before application.

[C] Preparation of Antiglare Film

The coating solution for cured layer shown in Table 4 were applied to the surface layer 2 of a web of the transparent base shown in Table 4 to the dry thickness shown using the slot die coater illustrated in FIG. 1 of JP 2003-211052A, dried at 30° C. for 15 seconds and then at 9.0° C. for 20 seconds, and cured by irradiation with UV light from a 160 W/cm air cooled metal halide lamp (from Eye Graphics Co., Ltd.) at an irradiation dose of 500 mJ/cm$^2$ in an nitrogen-purged atmosphere to form a cured layer. The resulting antiglare films were numbered from 1 to 17 and 20 to 30. The coating solutions for cured layer which were applied to dry thicknesses of 10 μm or greater (i.e., those used in antiglare films 13, 26, 27, and 30) were adjusted to have a solids concentration of 50 mass %. Films 18 and 18 were made using coating solutions G and H, respectively, in the same manner as described above, except that the drying and curing steps were carried out by contactless drying and thermal curing at 90° C. for 2 minutes and then thermal curing at 100° C. for 5 minutes. Coating solution G used in film 18 was prepared by mixing the components except TEDA and adding a 2% solution of TEDA to the mixture in a liquid delivery system, followed by mixing in a static mixer immediately before application. The web was not wound after casting until completion of the curing.

[D] Evaluation of Antiglare Film and Image Display Device Having the Same (1) Surface Profile The arithmetic average roughness Ra, mean spacing Sm, and average slope θa of the cured layer of the antiglare film were determined using Surfcorder SE-3500 from Kosaka Laboratory, Ltd. in accordance with JIS B0601 (2001). The results obtained are shown in Table 4.

The Ra of the surface A-side surface of the transparent base on which the cured layer was to be provided was measured. After the cured layer was formed thereon, a difference ΔRa between the Ra of the transparent base and the Ra of the cured layer was calculated. The results obtained are shown in Table 4. The Rt of the surface A-side surface of the transparent base was measured. The results are shown in Table 2.

(2) Slope Distribution Profile

The surface of the cured layer of the antiglare film was observed using SXM520-AS150 from Micromap Corp. (USA). A halogen lamp having an interference filter with a center wavelength of 560 nm was used as a light source. An objective lens having a magnification of 10 times was used. Data were acquired using a ⅔" CCD having 640×480 pixels. Thus, the measurement pitch in the X and Y directions was 1.3 μm, the unit measurement area was 0.8 μm$^2$, and the total measurement area was 500,000 μm$^2$ (0.5 mm$^2$). A slope angle was calculated from the data of three points per unit area, and integral values of frequencies of slopes from 0° to less than 0.3°, slopes from 0.3° to less than 5.0°, and slopes of 5.0° or more were calculated.

(3) Surface Profile of Transparent Base

The transparent base was microtomed and observed under an SEM from the direction normal to the section and from an oblique direction. A surface profile composed of flat portions substantially parallel to the film-forming plane and rounded protrusions was graded "good". A surface profile, while close to that graded "good", in which flat portions and protrusions were not easily distinguishable was graded "medium". A surface profile in which flat portions and protrusions are indistinguishable was graded "bad". The results of evaluation are shown in Table 2.

(4) Thickness of Cured Layer

The antiglare film was microtomed along a plane passing through the center of a particle. The sections were stained with osmic acid vapor for one day, and the surface profile of the cured layer was observed under an SEM. The minimum thickness of the cured layer right above the particle ($t_{min}$) and the maximum thickness of the other portions including flat portions of the cured layer ($t_{max}$) were measured at ten points of measurement. A ratio of the average $t_{min}$ to the average $t_{max}$ was calculated as a thickness ratio $t_{min}/t_{max}$. The results obtained are shown in Table 4.

(5) Transmitted Image Clarity

The image clarity of the antiglare film was determined using ICM-1T from Suga Test Instruments Co., Ltd. in accordance with JIS K7105 (1999). The optical comb width was 0.5 mm. The results are shown in Table 5.

(6) Haze (Internal Haze and Surface Haze)

(6-1) Total Haze

The total haze (H) of the antiglare film was measured with a haze meter NDH2000 from Nippon Denshoku Industries Co., Ltd. in accordance with JIS K7136.

(6-2) Internal Haze

A sample of the antiglare film was sandwiched between two 1 mm-thick glass plates (Micro-slide Glass 59111, from Matsunami Glass Ind., Ltd.) with a few drops of an immersion oil for microscopy (Nikon Immersion Oil Type A; refractive index=1.515) spread between each side of the film and the glass plate so as to achieve complete optical contact and thereby to eliminate a surface haze. In this state, the haze of the specimen was measured. Separately, the same glass plates were joined with the immersion oil spread therebetween to make a control specimen. The difference of the measured haze values (of the film and the control) is taken as an internal haze (Hin) of the film.

(6-3) Surface Haze

The internal haze (Hin) as calculated above was subtracted from the total haze (H) to give the surface haze (Hout) of the film.

The surface haze and the internal haze thus determined are shown in Table 5.

[E] Fabrication of Polarizing Plate

A stretched polyvinyl alcohol film was stained with iodine to make a polarizing film. Each of the antiglare films (films 1 to 30) was subjected to alkali saponification and bonded to one side of the polarizing film with its surface B (opposite to the cured layer side) facing the polarizing film using a polyvinyl alcohol adhesive. A commercially available cellulose triacetate film (TAC-TD80U, from Fuji Film Corp.) was bonded to the other side of the polarizing film with a polyvinyl alcohol adhesive. The resulting polarizing plates having an antiglare function were numbered from 1 to 30.

[F] Making of LCD and Evaluation of Display Qualities

A commercially available 32-inch full high definition LCD TV (LC-32GS10 from Sharp Corp.) was modified by replacing the polarizing plate on the viewer's side with each of polarizing plates 1 to 30 with the antiglare film facing a viewer using a pressure sensitive adhesive. The resulting modified LCD Tvs were evaluated for display qualities as follows. The results of evaluation are shown in Table 5.

(1) Prevention of Reflection of Ambient Light Source (Antiglare Function)

A fluorescent lamp was reflected on the LCD TV in a black display state with the backlight off, and the reflected image was observed.

AA: Light reflection is minimal and non-annoying.
A: Light is reflected but sufficiently diffused to cause no annoying reflection.
B: The shape of the fluorescent lamp is recognized but is not annoying.
C: The shape of the fluorescent lamp is reflected to an annoying degree.
D: The shape of the fluorescent lamp is clearly reflected to cause annoying glare.

(2) Scintillation

Scintillation on the LCD TV panel in a white display state with the backlight on was graded.

A: Scintillation is not annoying (pass).
B: Slight scintillation occurs but gives no problem in practical use (pass).
C: Scintillation is so intense as to annoy the observer (fail)

(3) Contrast

A spectroradiometer (CS1000A, from Konica Minolta Holdings, Inc.) was placed 150 cm in front of the center of the panel of the modified LCD. The luminance of a display in a black display mode (black luminance) and that in a white display mode (white luminance) were measured in a dark room. The ratio of the white luminance to the black luminance was calculated as a contrast. The contrast was relatively expressed with the contrast of the LCD using polarizing plate 28 having no antiglare function taken as 100%. A contrast of 98% to 100% was graded AA; a contrast of 95% to less than 98% was graded A; a contrast of 90% to less than 95% was graded B; a contrast less than 90% was graded C.

(4) Depth of Black

The modified LCD was driven in a black display mode, and the depth of black color was observed with the naked eye in ordinary domestic lighting (about 200 lux). A display producing a pleasingly deep shade of black was graded AA (pass); a display producing a good shade of black was graded A (pass); a display producing a black shade that is slightly washed out to a practically acceptable level was graded B (pass); and a display producing a washed out shade of black was graded C (fail).

Bases 1 and 2 had a total haze of 15% or less. Base 3 had a total haze of 53%. Bases 4 and 5 had a total haze of 36%. Bases 6, 7, 8, 9, 10, 11, and 12 had a total haze of 29%, 32%, 28%, 45%, 49%, 37, and 24%, respectively. The antiglare film prepared by providing a cured layer with a thickness of from 2.4 to 3.6 μm on any one of these bases satisfied every performance requirement.

TABLE 4

| | | | Cured Layer | | | | Frequency of Slope (%) | | | Thickness | |
| --- | --- | --- | --- | --- | --- | --- | --- | --- | --- | --- | --- |
| Film No. | Base No. | Coating Solution | Thickness (μm) | Ra (μm) | Sm (μm) | θa (°) | ≧0°, <3° | ≧0.3°, <5.0° | ≧5.0° | ΔRa | Ratio ($t_{min}/t_{max}$) | Remark |
| 1 | 1 | A | 2.4 | 0.08 | 32 | 0.2 | 31 | 61 | 8 | 0.02 | 0.62 | comparison |
| 2 | 2 | A | 2.4 | 0.26 | 48 | 1.9 | 2 | 66 | 32 | 0.05 | <0.01 | comparison |
| 3 | 3 | A | 2.4 | 0.12 | 46 | 0.5 | 26 | 66 | 8 | 0.01 | 0.24 | comparison |
| 4 | 4 | A | 1.8 | 0.09 | 41 | 0.7 | 28 | 68 | 4 | 0.02 | <0.01 | comparison |
| 5 | 5 | A | 1.8 | 0.10 | 62 | 1.5 | 11 | 83 | 6 | 0.10 | 0.24 | invention |
| 6 | 6 | A | 2.4 | 0.07 | 93 | 0.4 | 21 | 78 | 1 | 0.29 | 0.31 | invention |
| 7 | 16 | A | 2.4 | 0.07 | 89 | 0.4 | 22 | 77 | 1 | 0.25 | 0.33 | invention |
| 8 | 7 | A | 3.0 | 0.09 | 102 | 0.6 | 18 | 79 | 3 | 0.32 | 0.29 | invention |
| 9 | 8 | A | 2.4 | 0.18 | 116 | 1.3 | 23 | 68 | 9 | 0.23 | 0.23 | invention |
| 10 | 9 | A | 0.7 | 0.51 | 98 | 3.4 | 2 | 49 | 49 | 0.05 | <0.01 | comparison |

TABLE 4-continued

| Film No. | Base No. | Coating Solution | Cured Layer Thickness (μm) | Ra (μm) | Sm (μm) | θa (°) | Frequency of Slope (%) ≧0°, <3° | ≧0.3°, <5.0° | ≧5.0° | ΔRa | Thickness Ratio ($t_{min}/t_{max}$) | Remark |
|---|---|---|---|---|---|---|---|---|---|---|---|---|
| 11 | 9 | A | 2.4 | 0.18 | 122 | 1.1 | 6 | 86 | 8 | 0.38 | 0.35 | invention |
| 12 | 9 | A | 3.6 | 0.12 | 139 | 0.8 | 5 | 87 | 8 | 0.44 | 0.44 | invention |
| 13 | 9 | A | 17.0 | 0.02 | 195 | 0.2 | 46 | 54 | 0 | 0.54 | 0.82 | comparison |
| 14 | 9 | B | 2.4 | 0.18 | 92 | 1.3 | 7 | 84 | 9 | 0.38 | 0.36 | invention |
| 15 | 9 | D | 2.4 | 0.18 | 122 | 1.1 | 7 | 86 | 7 | 0.38 | 0.35 | invention |
| 16 | 9 | E | 2.4 | 0.16 | 136 | 1.0 | 6 | 87 | 7 | 0.40 | 0.34 | invention |
| 17 | 9 | F | 3.6 | 0.12 | 144 | 0.8 | 7 | 87 | 6 | 0.44 | 0.46 | invention |
| 18 | 9 | G | 3.6 | 0.11 | 162 | 0.7 | 8 | 87 | 5 | 0.45 | 0.48 | invention |
| 19 | 9 | H | 2.4 | 0.15 | 128 | 1.0 | 8 | 86 | 6 | 0.41 | 0.34 | invention |
| 20 | 9 | A | 3.6 | 0.17 | 142 | 1.2 | 4 | 87 | 9 | 0.32 | 0.42 | invention |
| 21 | 10 | A | 3.6 | 0.14 | 136 | 0.7 | 9 | 86 | 5 | 0.29 | 0.45 | invention |
| 22 | 11 | A | 3.6 | 0.11 | 103 | 0.6 | 12 | 85 | 3 | 0.35 | 0.46 | invention |
| 23 | 12 | A | 3.6 | 0.11 | 149 | 0.6 | 17 | 81 | 2 | 0.33 | 0.47 | invention |
| 24 | 13 | A | 5.4 | 0.12 | 165 | 0.7 | 11 | 85 | 4 | 0.69 | 0.44 | invention |
| 25 | 13 | A | 7.2 | 0.08 | 181 | 0.6 | 14 | 84 | 2 | 0.73 | 0.53 | invention |
| 26 | 13 | A | 12.0 | 0.06 | 192 | 0.5 | 19 | 80 | 1 | 0.75 | 0.62 | invention |
| 27 | 14 | A | 12.0 | 0.24 | 238 | 1.8 | 6 | 78 | 16 | 1.12 | 0.01 | comparison |
| 28 | 15 | A | 5.4 | 0.01 | 362 | 0.0 | 100 | 0 | 0 | 0.00 | — | comparison |
| 29 | 15 | C | 3.5 | 0.44 | 87 | 4.8 | 4 | 41 | 55 | −0.43 | 0.40 | comparison |
| 30 | 17 | A | 3.0 | 0.18 | 76 | 1.4 | 12 | 80 | 8 | 0.61 | 0.21 | invention |

TABLE 5

| Film No. | Image Clarity | Haze (%) Surface | Internal | Antiglare | Depth of Black | Front Contrast | Anti-scintillation | Remark |
|---|---|---|---|---|---|---|---|---|
| 1 | 81.6 | 2.1 | 0.1 | C | B | A | A | comparison |
| 2 | 16.2 | 8.5 | 0.2 | A | C | A | C | comparison |
| 3 | 18.1 | 3.9 | 48.1 | A | B | C | A | comparison |
| 4 | 77.1 | 5.6 | 0.2 | AA | B | A | C | comparison |
| 5 | 65.2 | 4.6 | 0.4 | A | A | A | B | invention |
| 6 | 67.5 | 4.6 | 1.1 | B | AA | AA | A | invention |
| 7 | 65.0 | 3.9 | 0.5 | A | A | A | A | invention |
| 8 | 43.2 | 3.6 | 11.2 | A | A | B | A | invention |
| 9 | 20.6 | 3.6 | 0.3 | A | A | A | A | invention |
| 10 | 13.9 | 32.8 | 0.5 | AA | C | C | A | comparison |
| 11 | 29.7 | 4.7 | 0.6 | A | A | AA | A | invention |
| 12 | 35.3 | 4.0 | 0.7 | A | A | AA | A | invention |
| 13 | 91.3 | 0.3 | 0.4 | D | A | A | A | comparison |
| 14 | 27.4 | 4.9 | 0.6 | AA | B | A | A | invention |
| 15 | 29.0 | 4.8 | 0.6 | A | A | AA | A | invention |
| 16 | 30.6 | 4.4 | 0.6 | A | A | AA | A | invention |
| 17 | 38.4 | 3.7 | 0.7 | A | A | AA | A | invention |
| 18 | 41.2 | 3.5 | 0.6 | A | A | AA | A | invention |
| 19 | 30.3 | 4.3 | 0.6 | A | A | AA | A | invention |
| 20 | 27.1 | 4.6 | 2.7 | AA | B | A | A | invention |
| 21 | 27.6 | 3.8 | 12.3 | A | A | A | A | invention |
| 22 | 51.7 | 2.4 | 6.7 | A | A | A | A | invention |
| 23 | 60.1 | 1.8 | 4.3 | A | AA | AA | A | invention |
| 24 | 56.4 | 3.1 | 0.4 | A | A | AA | A | invention |
| 25 | 62.1 | 2.7 | 0.3 | A | A | AA | A | invention |
| 26 | 68.6 | 2.1 | 0.4 | A | A | AA | A | invention |
| 27 | 18.2 | 6.5 | 0.3 | C | A | A | C | comparison |
| 28 | 99.2 | 0.0 | 0.2 | D | AA | AA | C | comparison |
| 29 | 17.8 | 4.9 | 42.4 | A | C | A | C | comparison |
| 30 | 21.1 | 4.4 | 14.2 | A | A | A | A | invention |

[G] Preparation of Coating Composition for Low Refractive Index Layer

[G-1] Preparation of Sol Solution (a)

In a reactor equipped with a stirrer and a reflux condenser were put 120 parts (by mass, hereinafter the same) of methyl ethyl ketone, 100 parts of acryloxypropyltrimethoxysilane (KBM-5103 from Shin-Etsu Chemical Co., Ltd.), and 3 parts of diisopropoxyaluminum ethylacetoacetate and mixed. Thirty parts of ion exchanged water was added thereto. The mixture was allowed to react at 60° C. for 4 hours, followed by cooling to room temperature to give sol solution (a). The sol had a mass average molecular weight of 1800, and 100% (by mass, hereinafter the same unless otherwise specified) of the oligomeric and polymeric components of the sol solution had a molecular weight of 1000 to 20000. Gas chromatography analysis of the sol solution (a) revealed no residue of the starting acryloxypropyltrimethoxysilane.

[G-2] Preparation of Hollow Silica Dispersion (A-1)

Thirty parts of acryloloxypropyltrimethoxysilane (KBM-5103 from Shin-Etsu Chemical Co., Ltd.), and 1.5 parts of diisopropoxyaluminum ethylacetoacetate (Chelope EP-12, from Hope Chemical Co., Ltd.) were added to and mixed with 500 parts of a hollow silica sol (particle size: about 40-50 nm; shell thickness: 6-8 nm; refractive index: 1.31; solid concentration: 20%; main solvent: isopropyl alcohol; prepared in accordance with Preparation Example 4 of JP 2002-79616A except for changing the particle size), and 9 parts of ion exchanged water was added thereto, followed by allowing the mixture to react at 60° C. for 8 hours. After cooling to room temperature, 1.8 parts of acetylacetone was added to give hollow silica dispersion (A-1). The hollow silica dispersion (A-1) had a solids content of 18% and a refractive index of 1.31 after solvent removal.

[G-3] Preparation of Coating Composition for Low Refractive Index Layer

In 100 parts of methyl ethyl ketone were dissolved 44.0 parts of the fluorine-containing copolymer (P-3) described in JP 2004-45462A (mass average molecular weight: ca. 50000), 6.0 parts of a dipentaerythritol pentaacrylate-dipentaerythritol hexaacrylate mixture (DPHA from Nippon Kayaku Co., Ltd.), 3.0 parts of a methacrylate-terminated silicone (RMS-033, from Gelest, Inc.), and 3.0 parts of Irgacure 907 (from Ciba Specialties Chemicals). To the solution were added 195 parts of the hollow silica dispersion (A-1) (total solids content of silica and surface treating agent: 39.0 parts) and 17.2 parts of the sol solution (a) (solid content: 5.0 parts). The mixture was diluted with cyclohexane and methyl ethyl ketone to have a total solids content of 6% and a cyclohexane to methyl ethyl ketone mass ratio of 10/9 to give a coating composition for low refractive index layer.

[H] Formation of Low Refractive Index Layer

The coating composition prepared above was applied to the cured layer of a web of film 5 (antiglare film) to a dry thickness of 90 nm using the slot die coater illustrated in FIG. 1 of JP 2003-211052A, dried at 60° C. for 50 seconds, and then cured by irradiation with UV light from a 240 W/cm air cooled metal halide lamp (from Eye Graphics Co., Ltd.) at an irradiation dose of 600 mJ/cm$^2$ in an nitrogen-purged atmosphere with an oxygen concentration of 100 ppm to form a low refractive index layer having a refractive index of 1.35. The resulting web of antireflection film (designated film 5L) was wound into roll.

[I] Evaluation of LCD Having Antireflection Film

Antireflection films 6L to 9L, 11L, 12L, and 14L to 26L were made in the same manner as for antireflection film 5L, except for using films 6 to 9, 11, 12, and 14 to 26, respectively.

Display qualities of modified LCDs using the resulting antireflection films were evaluated in the same manner as for the modified LCDs using the antiglare films. As a result, all the displays exhibited excellent antiglare properties of a grade AA and, when compared with those having the corresponding antiglare film, were given one higher grade of depth of black.

[J] Examples Using Cellulose Acetate Butyrate as Base Material

Dopes P-1, P-2, and P-3 having the formulations shown in Table 6 were prepared. Film 31 was made in the same manner as for film 7, except for making base 16 from dope P-1 in place of dope A (surface layer 1), dope P-2 in place of dope B (basal layer), and dope P-3 in place of dope H (surface layer 2). The transparent base had a refractive index of 1.48 and a surface texture composed of flat portions and hemispherical protrusions.

[K] Examples Using Polycarbonate as Base Material

Dopes Q-1 and P-2 having the formulations shown in Table 6 were prepared. Film 32 was made in the same manner as for film 7, except that the transparent base was made by co-casting dope Q-1 as a basal layer and dope Q-2 as a surface layer 2, with dope Q-1 in contact with the casting belt, without forming surface layer 1. The resulting transparent base had a refractive index of 1.58 and a surface texture composed of flat portions and hemispherical protrusions.

Materials used in the formulations shown in Table 6 are described below.

Cellulose acetate butyrate: CAB531-1 from Eastman Chemical Co.; degree of substitution with butyryl: 50 wt %; number average molecular weight: 40,000

Polycarbonate: polycarbonate resin having a mass average molecular weight of 45,000

UV absorber: benzotriazole UV absorber (20/80 mass % mixture of Tinuvin 326 and Tinuvin 328, both from Ciba Japan)

R972: Aerosil R972 from Nippon Aerosil Co., Ltd.; primary particle size: ca. 16 nm SKK-80: crosslinked polymethyl methacrylate true spherical particles from Sekisui Plastics Co., Ltd.; average particle size: 8 μm SBX-8: crosslinked polystyrene true spherical particles from Sekisui Plastics Co., Ltd.; average particle size: 8 μm

TABLE 6

| Formulation (part) | | P-1 | P-2 | P-3 | Q-1 | Q-2 |
|---|---|---|---|---|---|---|
| Cellulose Acetate Butyrate | | 100 | 100 | 100 | | |
| Polycarbonate | | | | | 100 | 100 |
| Triphenyl Phosphate | | 8 | 8 | 8 | | |
| Biphenyldiphenyl Phosphate | | 4 | 4 | 4 | | |
| UV Absorber | | 2.0 | 2.0 | 2.0 | 2.0 | 2.0 |
| Fine Particles | R972 (n* = 1.47) | 0.1 | | | | |
| | SKK-80M (n = 1.50) | | | 15.0 | | |
| | SBX-8 (n = 1.59) | | | | | 15.0 |
| Solvent | Methylene Chloride | 441 | 324 | 500 | 290 | 453 |
| | Methanol | 78 | 57 | 88 | 51 | 80 |

Note:
*n is a refractive index.

Films 31 and 32 were evaluated in the same manner as for films 1 to 30 and found to have the same levels of performance as film 7.

What is claimed is:

1. A method for making an antiglare film comprising:
(1) casting a dope containing at least a thermoplastic resin and transparent particles on a support, releasing the cast film from the support and drying the cast film, to make a transparent base;
(2) applying a coating solution containing at least a curing compound, a polymerization initiator and a solvent on the transparent base and removing the solvent by drying; and
(3) curing the curing compound to form a cured layer, wherein:
the transparent particles have an average primary particle size of greater than 2.5 μm and not greater than 12 μm,
the transparent base has on at least one side thereof flat portions substantially parallel to a film-forming plane and rounded protrusions arising from the transparent particles, the protrusions having a maximum height Rt from the flat portions of from 1 to 15 μm, and
the cured layer has an average thickness of from 1 to 15.0 μm and a surface profile with an arithmetic average roughness Ra, a mean spacing between peaks Sm, and an average slope θa, all as measured in accordance with JIS B0601, satisfying relationships (1) to (3):

$0.01\ \mu m \leq Ra \leq 0.2\ \mu m$     (1)

$10\ \mu m \leq Sm \leq 300\ \mu m$     (2)

$0.3° \leq \theta a \leq 1.5°$     (3).

2. A method for making an antiglare film comprising:
(1) casting a dope containing at least a thermoplastic resin and transparent particles on a support, releasing the cast film from the support and drying the cast film, to make a transparent base;
(2) applying a coating solution containing at least a curing compound, a polymerization initiator and a solvent on the transparent base and removing the solvent by drying; and
(3) curing the curing compound to form a cured layer, wherein:
the transparent particles have an average primary particle size of greater than 2.5 μm and not greater than 12 μm,
the transparent base has on at least one side thereof flat portions substantially parallel to a film-forming plane and rounded protrusions arising from the transparent particles, the protrusions having a maximum height Rt from the flat portions of from 1 to 15 μm, and
the cured layer has an average thickness of 1 to 15.0 μm and a surface profile with a slope distribution satisfying conditions (a) to (c):
(a) The integral value of the frequency of slopes from 0° to less than 0.3° is 0% to 25%;
(b) The integral value of the frequency of slopes from 0.3° to less than 5.0° is 65% to less than 100%;
(c) The integral value of the frequency of slopes of 5.0° or more is 0% to 10%.

3. The method according to claim 1, wherein the casting of a dope is casting at least two dopes simultaneously or successively, and the transparent particles are present in the dope adapted to form a layer adjacent to the cured layer.

4. The method according to claim 1, which does not comprise winding after the casting of a dope until the production of the antiglare film.

5. An antiglare film comprising a transparent base containing a thermosetting resin and transparent particles with an average primary particle size of greater than 2.5 μm and not greater than 12 μm and a cured layer with an average thickness of 1 to 15.0 μm on the transparent base,
the transparent base having, on its side having the cured layer, flat portions substantially parallel to a film-forming plane and rounded protrusions arising from the transparent particles, the protrusions having a maximum height Rt from the flat portions of from 1 to 15 μm.

6. The antiglare film according to claim 5, wherein the surface of the cured layer and the surface of the transparent base on its side having the cured layer have an arithmetic average roughness difference ΔRa of 0.1 to 1.0 μm, the arithmetic average roughness being determined in accordance with JIS B0601.

7. The antiglare film according to claim 5, wherein the cured layer has a ratio of its minimum thickness $t_{min}$ to its maximum thickness $t_{max}$ ($t_{min}/t_{max}$) of 0.01 to less than 0.8.

8. The antiglare film according to claim 5, wherein the transparent particles are nearly spherical resin particles.

9. The antiglare film according to any one of claims 5 to 8, wherein the transparent base and the transparent particles have an absolute difference in refractive index of less than 0.09.

10. The antiglare film according to claim 5, which has light scattering properties such that the antiglare film provides an image clarity of 20% to 75% as measured using an image clarity meter at an optical comb width of 0.5 mm in accordance with JIS K7105.

11. The antiglare film according to claim 5, which has an internal haze of 0.1% to 30% and a surface haze of 0.5% to 5.0%.

12. A polarizing plate comprising a polarizing film and a protective film on at least one side of the polarizing film, wherein the protective film is the antiglare film according to claim 5.

13. An image display device comprising the antiglare film according to claim 5.

14. A transmissive or semi-transmissive liquid crystal display comprising a liquid crystal cell and a polarizing plate, wherein the polarizing plate is the polarizing plate according to claim 12 and is disposed on a front side of the liquid crystal cell.

15. A transmissive or semi-transmissive liquid crystal display comprising a liquid crystal cell and a polarizing plate, wherein the polarizing plate is the polarizing plate according to claim 12 and is disposed on a backlight side of the liquid crystal cell.

16. A transmissive or semi-transmissive liquid crystal display comprising a liquid crystal cell and a polarizing plate, wherein the polarizing plate is the polarizing plate according to claim 12 and is disposed on each of a front side and a backlight side of the liquid crystal cell.

* * * * *